(12) United States Patent
Kadambi et al.

(10) Patent No.: US 12,539,047 B2
(45) Date of Patent: Feb. 3, 2026

(54) SYNTHETIC GENERATION OF FACE VIDEOS WITH PLETHYSMOGRAPH PHYSIOLOGY

(71) Applicant: The Regents of the University of California, Oakland, CA (US)

(72) Inventors: Achuta Kadambi, Los Angeles, CA (US); Laleh Jalilian, Santa Monica, CA (US); Zhen Wang, Los Angeles, CA (US); Yunhao Ba, Los Angeles, CA (US); Pradyumna Chari, Los Angeles, CA (US); Oyku Deniz Bozkurt, Los Angeles, CA (US); Maxime Cannesson, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 18/854,940

(22) PCT Filed: Apr. 6, 2023

(86) PCT No.: PCT/US2023/065448
§ 371 (c)(1),
(2) Date: Oct. 7, 2024

(87) PCT Pub. No.: WO2023/196909
PCT Pub. Date: Oct. 12, 2023

(65) Prior Publication Data
US 2025/0241548 A1 Jul. 31, 2025

Related U.S. Application Data

(60) Provisional application No. 63/362,637, filed on Apr. 7, 2022.

(51) Int. Cl.
*A61B 5/024* (2006.01)
*A61B 5/0295* (2006.01)
(Continued)

(52) U.S. Cl.
CPC ........ *A61B 5/02416* (2013.01); *A61B 5/0295* (2013.01); *G06T 13/40* (2013.01); *G06T 17/20* (2013.01); *G06T 2210/41* (2013.01)

(58) Field of Classification Search
CPC . A61B 5/02416; A61B 5/0295; A61B 5/7267; G06T 13/40; G06T 15/20; G06T 17/20; G06T 2210/41
See application file for complete search history.

(56) References Cited

U.S. PATENT DOCUMENTS 9,055,928 B2 6/2015 Mccombie et al.
10,398,353 B2 9/2019 Addison et al.
(Continued)

FOREIGN PATENT DOCUMENTS

CN 105266787 B 7/2018
DE 102010056615 A1 7/2012
(Continued)

OTHER PUBLICATIONS

Kadambi, "Achieving Fairness in Medical Devices", Science, vol. 372, No. 6537, 2021, pp. 30-31, doi: 10.1126/science.abe9195.
(Continued)

*Primary Examiner* — Mark D Remaly
(74) *Attorney, Agent, or Firm* — KPPB LLP

(57) ABSTRACT

Systems and methods for synthetic generation of face videos are described. An embodiment includes receiving an input image; encoding the input image into a UV albedo map, a 3D mesh, an illumination model $L_{SH}$, and a camera model c; decomposing the UV albedo map into a UV physiological map; varying the UV physiological map according to a target Remote Photoplethysmography (rPPG) signal; generating a plurality of modified PPG UV maps; combining at least one modified PPG UV map with the illumination model $L_{SH}$, camera model c to render final frames with randomized
(Continued)

motion; and generating a synthetic rPPG video using the final frames with randomized motion.

14 Claims, 8 Drawing Sheets

(51) Int. Cl.
    *G06T 13/40* (2011.01)
    *G06T 17/20* (2006.01)

(56) References Cited

U.S. PATENT DOCUMENTS

| | | | |
|---|---|---|---|
| 2012/0004523 | A1 | 1/2012 | Richter et al. |
| 2014/0235964 | A1 | 8/2014 | Banet et al. |
| 2015/0164322 | A1 | 6/2015 | Derchak |
| 2018/0140255 | A1 | 5/2018 | Tao et al. |
| 2019/0012599 | A1 | 1/2019 | El Kaliouby et al. |
| 2019/0117083 | A1 | 4/2019 | Wang et al. |
| 2019/0388667 | A1 | 12/2019 | Xu |
| 2021/0386383 | A1 | 12/2021 | Mcduff |
| 2021/0398337 | A1 | 12/2021 | Mcduff et al. |
| 2023/0233091 | A1 | 7/2023 | Kadambi et al. |

FOREIGN PATENT DOCUMENTS

| | | |
|---|---|---|
| JP | 6219279 B2 | 10/2017 |
| KR | 102081241 B1 | 2/2020 |
| WO | 2006119345 A2 | 11/2006 |
| WO | 2013027027 A2 | 2/2013 |
| WO | 2017194915 A1 | 11/2017 |
| WO | 2017212174 A1 | 12/2017 |
| WO | 2019202319 A1 | 10/2019 |
| WO | 2021257737 A1 | 12/2021 |
| WO | 2023196909 A1 | 10/2023 |

OTHER PUBLICATIONS

McDuff et al., "Improvements in Remote Cardiopulmonary Measurement Using a Five Band Digital Camera", IEEE Transactions on Biomedical Engineering, vol. 61. No. 10, Oct. 2014, pp. 2593-2601, doi: 10.1109/TBME.2014.2323695.
McDuff et al., "iPhys: An Open Non-Contact Imaging-Based Physiological Measurement Toolbox", Annual International Conference of the IEEE Engineering in Medicine and Biology Society, 2019, pp. 6521-6524, doi: 10.1109/EMBC.2019.8857012.
Meng et al., "Depression Recognition based on Dynamic Facial and Vocal Expression Features using Partial Least Square Regression", AVEC '13: Proceedings of the 3rd ACM international workshop on Audio/visual emotion challenge, Oct. 2013, pp. 21-29, doi: 10.1145/2512530.2512532.
Mercuri et al., "Analysis of an Indoor Biomedical Radar-Based System for Health Monitoring", IEEE Transactions on Microwave Theory and Techniques, vol. 61, No. 5, May 2013, pp. 2061-2068, first published Mar. 7, 2013, doi: 10.1109/TMTT.2013.2247619.
Mercuri et al., "Vital-sign monitoring and spatial tracking of multiple people using a contactless radar-based sensor", Nature Electronics, Jun. 2019, vol. 2, No. 6, pp. 252-262, doi: 10.1038/s41928-019-0258-6.
Meziatisabour et al., "UBFC-Phys: A Multimodal Database for Psychophysiological Studies of Social Stress", IEEE Transactions on Affective Computing, vol. 14, No. 1, Feb. 3, 2021, pp. 622-636, doi: 10.1109/TAFFC.2021.3056960.
Mouawad et al., "Robust Detection of COVID-19 in Cough Sounds: Using Recurrence Dynamics and Variable Markov Model", SN Computer Science, vol. 2, No. 34, 2021, 13 pgs., doi: 10.1007/s42979-020-00422-6.
Nakajima et al., "A method for measuring respiration and physical activity in bed by optical flow analysis", Proceeding of the 19th Annual International Conference of the IEEE Engineering in Medicine and Biology Society, 'Magnificent Milestones and Emerging Opportunities in Medical Engineering', 2019, (Cat. No. 97CH36136), vol. 5, pp. 2054-2057.
Nakajima et al., "Development of real-time image sequence analysis for evaluating posture change and respiratory rate of a subject in bed", Physiological Measurement, vol. 22, No. 3, Aug. 1, 2001, pp. N21-N28, doi: 10.1088/0967-3334/22/3/401.
Nasir et al., "Multimodal and multiresolution depression detection from speech and facial landmark features", AVEC '16: Proceedings of the 6th International Workshop on Audio-Visual Emotion Challenge, Oct. 16, 2016, pp. 43-50, doi: 10.1145/2988257.2988261.
Niu et al., "RhythmNet: End-to-end Heart Rate Estimation from Face via Spatial-temporal Representation", IEEE Transactions on Image Processing, vol. 29, 2019, pp. 2409-2423, doi: 10.1109/TIP.2019.2947204.
Niu et al., "Video-Based Remote Physiological Measurement via Cross-Verified Feature Disentangling", Proceedings of the European Conference on Computer Vision, 2020, pp. 295-310, doi: 10.1007/978-3-030-58536-5_18.
Niu et al., "VIPL-HR: A Multi-modal Database for Pulse Estimation from Less-constrained Face Video", arXiv:1810.04927v2 [cs.CV], Nov. 27, 2018, 16 pgs.
Nock et al., "Fuzzy aggregation for multimodal remote sensing classification", IEEE International Conference of Fuzzy Systems (Fuzz-IEEE), Jul. 2020, pp. 1-7, doi: 10.1109/Fuzz48607.2020.9177691.
Nosrati et al., "High-Accuracy Heart Rate Variability Monitoring Using Doppler Radar Based on Gaussian Pulse Train Modeling and FTPR Algorithm", IEEE Transactions on Microwave Theory and Techniques, vol. 66, No. 1, Jan. 2018, pp. 556-567, doi: 10.1109/TMTT.2017.2721407.
Nowara et al., "Combining Magnification and Measurement for Non-Contact Cardiac Monitoring", Proceedings of the IEEE/CVF Conference on Computer Vision and Pattern Recognition (CVPR) Workshops, 2021, pp. 3810-3819, doi: 10.1109/CVPRW53098.2021.00422.
Nowara et al., "SparsePPG: Towards Driver Monitoring Using Camera-Based Vital Signs Estimation in Near-Infrared", IEEE/CVF Conference on Computer Vision and Pattern Recognition Workshops (CVPRW), Jun. 18-22, 2018, 10 pgs., doi: 10.1109/CVPRW.2018.00174.
Nowara et al., "The Benefit of Distraction: Denoising Remote Vitals Measurements using Inverse Attention", arXiv:2010.07770v1 [eess.IV], Oct. 14, 2020, 14 pgs.
Oliver et al., "HealthGear: Automatic Sleep Apnea Detection and Monitoring with a Mobile Phone", Journal of Communications, vol. 2, No. 2, Mar. 2007, pp. 1-9, doi: 10.4304/jcm.2.2.1-9.
Ortega et al., "Multimodal Fusion with Deep Neural Networks for Audio-Video Emotion Recognition", arXiv:1907.03196v1 [cs.CV], Jul. 6, 2019, 7 pgs.
Ouyang et al., "DeepID-Net: Deformable Deep Convolutional Neural Networks for Object Detection", Proceedings of the IEEE Conference on Computer Vision and Pattern Recognition (CVPR), Jun. 2015, pp. 2403-2412.
Pampouchidou et al., "Automatic Assessment of Depression Based on Visual Cues: A Systematic Review", IEEE Transactions on Affective Computing, vol. 10, No. 4, Oct.-Dec. 2019, first published Sep. 28, 2017, pp. 445-470, doi: 10.1109/TAFFC.2017.2724035.
Pang et al., "Multimodal Learning with Deep Boltzmann Machine for Emotion Prediction in User Generated Videos", Proceedings of the 5th ACM on International Conference on Multimedia Retrieval, Jun. 2015, pp. 619-622, doi: 10.1145/2671188.2749400.
Paszke et al., "PyTorch: An Imperative Style, High-Performance Deep Learning Library", Advances in neural information processing systems, vol. 32, 2019, pp. 8026-8037.
Paysan et al., "A 3D Face Model for Pose and Illumination Invariant Face Recognition", IEEE international conference on advanced video and signal based surveillance, 2009, pp. 296-301, doi: 10.1109/AVSS.2009.58.
Peeters, "A large set of audio features for sound description (similarity and classification) in the CUIADO project", IRCAM, Paris, France, Apr. 23, 2004, 25 pgs.

(56) References Cited

OTHER PUBLICATIONS

Peng et al., "A Portable FMCW Interferometry Radar with Programmable Low-IF Architecture for Localization, ISAR Imaging, and Vital Sign Tracking", IEEE Transactions on Microwave Theory and Techniques, vol. 65, No. 4, Apr. 2017, first published Dec. 15, 2016, pp. 1334-1344, doi: 10.1109/TMTT.2016.2633352.

Penne et al., "Robust real-time 3D respiratory motion detection using time-of-flight cameras", International Journal of Computer Assisted Radiology and Surgery, vol. 3, No. 5, Nov. 2008, pp. 427-431, doi: 10.1007/s11548-008-0245-2.

Pimentel et al., "Toward a Robust Estimation of Respiratory Rate From Pulse Oximeters", IEEE Transactions on Biomedical Engineering, vol. 64, No. 8, Aug. 2017, pp. 1914-1923, doi: 10.1109/TBME.2016.2613124.

Po et al., "Block-based adaptive ROI for remote photoplethysmography", Multimedia Tools and Applications, vol. 77, 2018, pp. 6503-6529, published online Mar. 13, 2017, doi: 10.1007/s11042-017-4563-7.

Poh et al., "Advancements in Noncontact, Multiparameter Physiological Measurements Using a Webcam", IEEE Transactions on Biomedical Engineering, vol. 58, No. 1, Jan. 2011, pp. 7-11, doi: 10.1109/TBME.2010.2086456.

Poh et al., "Non-contact, automated cardiac pulse measurements using video imaging and blind source separation", Optics Express, vol. 18, No. 10, May 10, 2010, first published May 7, 2010, pp. 10762-10774, doi: 10.1364/OE.18.010762.

Pramono et al., "Automatic Cough Detection in Acoustic Signal using Spectral Features", 41st Annual International Conference Engineering in Medicine Biological Society, Jul. 2019, pp. 7153-7156, doi: 10.1109/EMBC.2019.8857792.

Preece et al., "Spectral Filter Optimization for the Recovery of Parameters which Describe Human Skin", IEEE transactions on pattern analysis and machine intelligence, vol. 26, No. 7, Jul. 2004, pp. 913-922, doi: 10.1109/TPAMI.2004.36.

Prochazka et al., "Breathing Analysis Using Thermal and Depth Imaging Camera Video Records", Sensors, vol. 17, No. 6, Article 1408, Jun. 16, 2017, pp. 1408-1-1408-10, doi: 10.3390/s17061408.

Rahman et al., "Doppler Radar Techniques for Accurate Respiration Characterization and Subject Identification", IEEE Journal on Emerging and Selected Topics in Circuits and Systems, vol. 8, No. 2, Jun. 2018, first published Mar. 22, 2018, pp. 350-359, doi: 10.1109/JETCAS.2018.2818181.

Ramamoorthi et al., "An Efficient Representation for Irradiance Environment Maps", Proceedings of the 28th annual conference on Computer graphics and interactive techniques—SIGGRAPH '01, 2001, pp. 497-500, doi: 10.1145/383259.383317.

Redmon et al., "You Only Look Once: Unified, Real-Time Object Detection", Proceedings of the IEEE Conference on Computer Vision and Pattern Recognition (CVPR), Jun. 2016, pp. 779-778, doi: 10.1109/CVPR.2016.91.

Ren et al., "Face Alignment at 3000 FPS via Regressing Local Binary Features", IEEE Conference on Computer Vision and Pattern Recognition, Jun. 23-28, 2014, 8 pgs., doi: 10.1109/CVPR.2014.218.

Ren et al., "Phase-Based Methods for Heart Rate Detection Using UWB Impulse Doppler Radar", IEEE Transactions on Microwave Theory and Techniques, vol. 64, No. 10, Oct. 2016, pp. 3319-3331, doi: 10.1109/TMTT.2016.2597824.

Ring et al., "Infrared thermal imaging in medicine", Physiological Measurement, vol. 33, No. 3, Mar. 2012, pp. R33-R46, doi: 10.1088/0967-3334/33/3/R33.

Rosenberger et al., "3D high-resolution multimodal imaging system for real-time applications", Proceedings of SPIE, vol. 11397, Dimensional Optical Metrology and Inspection for Practical Applications IX, Apr. 21, 2020, pp. 1139704-1-1139704-10, doi: 10.1117/12.2558413.

Shi et al., "Good features to track", IEEE Conference on Computer Vision and Pattern Recognition (CVPR), Jun. 1994, pp. 593-600.

Smith, "Cough: Assessment and Equipment", The Buyers Guide to Respiratory Care Products, 2008, pp. 96-101.

Subirana et al., "Call for a Wake Standard for Artificial Intelligence", Communications of the ACM, vol. 63, No. 7, Jul. 2020, pp. 32-35, doi: 10.1145/3402193.

Subirana et al., "On the Forgetting of College Academics at "ebbinghaus speed"?", Center for Brains, Minds and Machines (CBMM), CBMM Memo 068, Jun. 20, 2017, 12 pgs.

Sun et al., "Imaging the cardiovascular pulse", IEEE Computer Society Conference on Computer Vision and Pattern Recognition (CVPR'05), vol. 2, 2005, pp. 416-421, doi: 10.1109/CVPR.2005.184.

Tan et al., "Transmission and clinical characteristics of asymptomatic patients with SARS-CoV-2 infection", Future Virology, vol. 15, No. 6, 2020, published online Jun. 12, 2020, pp. 373-380, doi: 10.2217/fvl-2020-0087.

Tang et al., "Noncontact Pulse Transit Time Measurement Using a Single-Frequency Continuous-Wave Radar", 2018 IEEE/MTT-S International Microwave Symposium—IMS, Jun. 10-15, 2018, pp. 1409-1412, DOI: 10.1109/MWSYM.2018.8439326.

Teague et al., "A Wearable, Multimodal Sensing System to Monitor Knee Joint Health", IEEE Sensors Journal, vol. 20, No. 18, Sep. 15, 2020, first published May 14, 2020, pp. 10323-10334, doi: 10.1109/JSEN.2020.2994552.

Tsai et al., "Multimodal Transformer for Unaligned Multimodal Language Sequences", Proceedings of the Annual Meeting of the Association for Computational Linguistics, Jul. 2019, pp. 6558-6569, doi: 10.18653/v1/p19-1656.

Tsou et al., "Multi-Task Learning for Simultaneous Video Generation and Remote Photoplethysmography Estimation", Proceedings of the Asian Conference on Computer Vision, 2020, 16 pgs., doi: 10.1007/978-3-030-69541-5_24.

Tulyakov et al., "Self-Adaptive Matrix Completion for Heart Rate Estimation from Face Videos under Realistic Conditions", Proceedings of IEEE Conference on Computer Vision and Pattern Recognition (CVPR), Jun. 2016, pp. 2396-2304, doi: 10.1109/CVPR.2016.263.

Van Gastel et al., "Motion Robust Remote-PPG in Infrared", IEEE Transactions on Biomedical Engineering, vol. 62, No. 5, May 2015, first published Jan. 9, 2015, pp. 1425-1433, doi: 10.1109/TBME.2015.2390261.

Vaswani et al., "Attention Is All You Need", Proceedings of the 31st International Conference on Neural Information Processing Systems (NIPS 2017), Long Beach, CA, USA, pp. 5998-6008; URL: [https://dl.acm.org/dol/10.5555/3295222.3295349].

Veal et al., "Linear Order Statistic Neuron", IEEE International Conference on Fuzzy Systems (Fuzz-IEEE), Jun. 2019, pp. 1-6, doi: 10.1109/Fuzz-IEEE.2019.8858802.

Villarroel et al., "Non-contact physiological monitoring of preterm infants in the Neonatal Intensive Care Unit", Nature Partner Journals Digital Medicine, vol. 2, No. 1, 2019, 18 pgs., doi: 10.1038/s41746-019-0199-5.

Viola et al., "Robust Real-time Face Detection", International Journal of Computer Vision, Kluwer Academic Publishers, vol. 57, No. 2, 2004, published online Jan. 10, 2004, pp. 137-154, doi: 10.1023/b:visi.0000013087.49260.fb.

Vizbara, "Comparison of green, blue and infrared light in wrist and forehead photoplethysmography", Biomedical Engineering, vol. 17. No. 1, 2016, pp. 78-81.

Wang et al., "A Hybrid FMCW-Interferometry Radar for Indoor Precise Positioning and Versatile Life Activity Monitoring", IEEE Transactions on Microwave Theory and Techniques, vol. 62, No. 11, Nov. 2014, pp. 2812-2822, doi: 10.1109/TMTT.2014.235857.

Wang et al., "Algorithmic principles of remote-PPG", IEEE Transactions on Biomedical Engineering, vol. 64, No. 7, 2016, pp. 1479-1491, doi: 10.1109/TBME.2016.2609282.

Wang et al., "Color-distortion filtering for remote photoplethysmography", 12th IEEE Conference on Automatic Face and Gesture Recognition, Jun. 20, 2017, pp. 71-78, doi: 10.1109/FG.2017.18.

Wang et al., "Noncontact distance and amplitude-independent vibration measurement based on an extended dacm algorithm", IEEE Transactions on Instrumentation and Measurement, vol. 63, No. 1, Jan. 2014, pp. 145-153, doi: 10.1109/TIM.2013.2277530.

(56) References Cited

OTHER PUBLICATIONS

Wang et al., "Quality metric for camera-based pulse rate monitoring in fitness exercise", IEEE International Conference on Image Processing (ICIP), 2016, pp. 2430-2434, doi: 10.1109/ICIP.2016.7532795.

Wang et al., "Racial Faces in-the-Wild: Reducing Racial Bias by Information Maximization Adaptation Network", Proceedings of the IEEE/CVF International Conference on Computer Vision, 2019, pp. 692-702, doi: 10.1109/ICCV.2019.00078.

Wang et al., "Robust heart rate from fitness videos", Physiological Measurement, vol. 38, No. 6, May 8, 2017, pp. 1023-1044, doi: 10.1088/1361-6579/aa6d02.

Welykholowa et al., "Multimodal Photoplethysmography-Based Approaches for Improved Detection of Hypertension", Journal of Clinical Medicine, vol. 9, No. 4, Article 1203, Apr. 22, 2020, 20 pgs., doi: 10.3390/jcm9041203.

Wiesner et al., "Monitoring Patient Respiration using a Single Optical Camera", 29th Annual International Conference of IEEE Engineering in Medicine and Biology Society, 2007, pp. 2740-2743, doi: 10.1109/IEMBS.2007.4352895.

Williamson et al., "Vocal and Facial Biomarkers of Depression Based on Motor Incoordination and Timing", AVEC '14: Proceedings of the 4th International Workshop on Audio/Visual Emotion Challenge, Orlando, FL, Nov. 7, 2014, pp. 65-72, doi: 10.1145/2661806.2661809.

Wu et al., "A Contactless Sport Training Monitor Based on Facial Expression and Remote-PPG", IEEE International Conference on Systems, Man, and Cybernetics, SMC 2017, Banff Center, Banff, Canada, Oct. 5-8, 2017, pp. 846-851, doi: 10.1109/SMC.2017.8122715.

Yan et al., "Analysis of detection methods of RF vibrometer for complex motion measurement", IEEE Transactions on Microwave Theory and Techniques, vol. 59, No. 12, Dec. 2011, pp. 3556-3566, doi: 10.1109/TMTT.2011.2172624.

Yang et al., "Real-Time Specular Highlight Removal Using Bilateral Filtering", ECCV'10: Proceedings of the 11th European conference on Computer vision: Part IV, Lecture Notes in Computer Science (LNCS2010), vol. 6314, Sep. 5, 2010, pp. 87-100.

Yu et al., "Remote Photoplethysmograph Signal Measurement from Facial Videos Using Spatio-Temporal Networks", arXiv:1905.02419v2 [cs.CV], Jul. 31, 2019, 12 pgs.

Zhang et al., "Enhanced Contactless Vital Sign Estimation from Real-Time Multimodal 3D Image Data", Journal of Imaging, vol. 6, No. 123, Nov. 12, 2020, 15 pgs., doi: 10.3390/jimaging6110123.

Zhang et al., "Multimodal Deep Convolutional Neural Network for Audio-Visual Emotion Recognition", ICMR '16 Proceedings of the 2016 ACM on International Conference on Multimedia Retrieval, Jun. 6-9, 2016, pp. 281-284, doi: 10.1145/2911996.2912051.

Zhang et al., "Multimodal Spontaneous Emotion Corpus for Human Behavior Analysis", Proceedings of the IEEE conference on computer vision and pattern recognition, 2016, pp. 3438-3446, doi: 10.1109/CVPR.2016.374.

Zhou et al., "Tackling Mental Health by Integrating Unobtrusive Multimodal Sensing", Proceedings of the AAAI Conference on Artificial Intelligence, vol. 29, No. 1, Feb. 2015, 8 pgs.

Zou et al., "Ensuring that biomedical AI benefits diverse populations", EBioMedicine, vol. 67, No. 103358, May 2021, 6 pgs., doi: 10.1016/j.ebiom.2021.103358.

International Preliminary Report on Patentability for International Application PCT/US2021/037682, Report issued Dec. 13, 2022, Mailed on Dec. 29, 2022, 7 pgs.

International Preliminary Report on Patentability for International Application PCT/US2023/065448, Report issued Oct. 8, 2024, Mailed Oct. 17, 2024, 4 pgs.

International Search Report and Written Opinion for International Application No. PCT/US2021/037682, Search completed Oct. 26, 2021, Mailed on Nov. 24, 2021, 21 pgs.

International Search Report and Written Opinion for International Application No. PCT/US2023/065448, Search completed Jun. 6, 2023, Mailed Jul. 10, 2023, 8 pgs.

Allado et al., "Innovative measurement of routine physiological variables (heart rate, respiratory rate and oxygen saturation) using a remote photoplethysmography imaging system: a prospective comparative trial protocol", British Medical Journal Open, vol. 11, No. 8, Article e047896, Aug. 13, 2021, 4 pgs., doi: 10.1136/bmjopen-2020-047896.

Al-Naji et al., "Real Time Apnoea Monitoring of Children Using the Microsoft Kinect Sensor: A Pilot Study", Sensors, vol. 17, No. 286, Feb. 3, 2017, 15 pgs., doi: 10.3390/s17020286.

Alotaibi et al., "A Biophysical 3D Morphable Model of Face Appearance", IEEE International Conference on Computer Vision Workshops, 2017, pp. 824-832, doi: 10.1109/ICCVW.2017.102.

Alotaibi et al., "BioFaceNet: Deep Biophysical Face Image Interpretation", arXiv:1908.10578v2 [cs.CV], Sep. 13, 2019, 13 pgs.

Alotaibi et al., "Decomposing Multispectral Face Images into Diffuse and Specular Shading and Biophysical Parameters", arXiv:1902.06557v1 [cs.CV] Feb. 18, 2019, 5 pgs.

Alqassim et al., "Sleep Apnea Monitoring Using Mobile Phones", IEEE 14th International Conference of e-Health Networking, Applications and Services (Health.com), 2012, pp. 443-446, doi: 10.1109/HealthCom.2012.6379457.

Ba et al., "Overcoming Difficulty in Obtaining Dark-skinned Subjects for Remote-PPG by Synthetic Augmentation", arXiv:2106.06007v1 [cs.CV], Jun. 10, 2021, 14 pgs.

Badura et al., "Multimodal Signal Acquisition for Pain Assessment in Physiotherapy", Information Technology in Biomedicine, Advances in Intelligent Systems and Computing, vol. 1186, 2021, pp. 227-237, Springer, Cham., doi: 10.1007/978-3-030-49666-1_18.

Baltrusaitis et al., "OpenFace: an open source facial behavior analysis toolkit", IEEE Winter Conference on Application of Computer Vision (WACV), 2016, 10 pgs., doi: 10.1109/WACV.2016.7477553.

Bernal et al., "Deep temporal multimodal fusion for medical procedure monitoring using wearable sensors", IEEE Transactions on Multimedia, vol. 20, No. 1, Jan. 1, 2018, pp. 107-118, doi: 10.1109/TMM.2017.2726187.

Blackford et al., "Measurements of pulse rate using long-range imaging photoplethysmography and sunlight illumination outdoors", Proceedings of the SPIE, Optical Diagnostics and Sensing XVII: Toward Point-of-Care Diagnostics, vol. 10072, No. 100720S, Feb. 17, 2017, pp. 122-134, doi: 10.1117/12.2253460.

Bobbia et al., "Unsupervised skin tissue segmentation for remote photoplethysmography", Pattern Recognition Letters, vol. 124, Jun. 1, 2019, pp. 82-90, doi: 10.1016/j.patrec.2017.10.017.

Brown et al., "Language Models are Few-Shot Learners", 34th Conference on Neural Information Processing Systems (NeurIPS 2020), Vancouver, Canada, 2020, 25 pgs.

Cano-Cordoba et al., "Theory of Intelligence with Forgetting: Mathematical Theorems Explaining Human Universal Forgetting using "Forgetting Neural Networks"", Technical report, Center for Brains, Minds and Machines (CBMM), 2017, 67 pgs.

Cao et al., "Spiking Deep Convolutional Neural Networks for Energy-Efficient Object Recognition", International Journal of Computer Vision, vol. 113, No. 1, May 2015, pp. 54-66, doi: 10.1007/s11263-014-0788-3.

Cardinal et al., "ETS System for AV+EC 2015 Challenge", AVEC '15: Proceedings of the 5th International Workshop on Audio/Visual Emotion Challenge, Brisbane, Australia, Oct. 26, 2015, pp. 17-23, doi: 10.1145/2808196.2811639.

Chang et al., "Perceived Phonatory Effort and Phonation Threshold Pressure Across a Prolonged Voice Loading Task: A Study of Vocal Fatigue", Journal of Voice, vol. 18, No. 4, Dec. 2004, pp. 454-466, doi: 10.1016/j.jvoice.2004.01.004.

Chari et al., "Diverse R-PPG: Camera-Based Heart Rate Estimation for Diverse Subject Skin-tones and Scenes", arXiv:2010.12769 [eess.IV], 2020, 49 pgs.

Chekmenev et al., "Multiresolution Approach for Non-Contact Measurements of Arterial Pulse using Thermal Imaging", Conference on Computer Vision and Pattern Recognition Workshop, Jul. 2006, 8 pgs., doi: 10.1109/CVPRW.2006.139.

(56) References Cited

OTHER PUBLICATIONS

Chekmenev et al., "Non-contact, wavelet-based measurement of vital signs using thermal imaging", 1st International Conference on Graphics, Vision and Image Processing (GVIP), Cairo, Egypt, 2005, pp. 107-112.

Chekmenev et al., "Thermal Imaging of the Superficial Temporal Artery: An Arterial Pulse Recovery Model", Proceedings / CVPR, IEEE Computer Society Conference on Computer Vision and Pattern Recognition, Jun. 2007, 6 pgs., doi: 10.1109/CVPR.2007.383443.

Chen et al., "DeepPhys: Video-Based Physiological Measurement Using Convolutional Attention Networks", arXiv:1805.07888v2 [cs.CV], Aug. 7, 2018, 16 pgs.

Chen et al., "Micro-Doppler Effect in Radar: Phenomenon, Model, and Simulation Study", IEEE Transactions on Aerospace and Electronic Systems, vol. 42, No. 1, Jan. 2006, pp. 2-21, doi: 10.1109/TAES.2006.1603402.

Chen et al., "Multi-modal Dimensional Emotion Recognition using Recurrent Neural Networks", Proceedings of the 5th International Workshop on Audio/Visual, emotion Challenge, AVEC'15, Oct. 26, 2015, pp. 49-56, doi: 10.1145/2808196.2811638.

Cho et al., "Instant Stress: Detection of Perceived Mental Stress Through Smartphone Photoplethysmography and Thermal Imaging", JMIR Mental Health, vol. 6, No. 4, e10140, Apr. 9, 2019, 23 pgs., doi: 10.2196/10140.

Cho et al., "Robust tracking of respiratory rate in high dynamic range scenes using mobile thermal imaging", Biomedical Optics Express, vol. 8, No. 10, Oct. 1, 2017, pp. 4480-4503, doi: 10.1364/BOE.8.004480.

Cohn et al., "Detecting Depression from Facial Actions and Vocal Prosody", 3rd International Conference of Affective Computing and Intelligent Interaction and Workshops, 2009, pp. 1-7, doi: 10.1109/ACII.2009.5349358.

Costa et al., "The need for harmonisation and innovation of neuropsychological assessment in neurodegenerative dementias in Europe: consensus document of the Joint Program for Neurodegenerative Diseases Working Group", Alzheimer's Research & Therapy, vol. 9, No. 27, Apr. 17, 2017, pp. 1-15, doi: 10.1186/s13195-017-0254-x.

Dasari et al., "Evaluation of biases in remote photoplethysmography methods", Nature Partner Journals Digital Medicine, vol. 4, No. 1, 2021, 13 pgs., doi: 10.1038/s41746-021-00462-z.

De Haan et al., "Improved motion robustness of remote-PPG by using the blood volume pulse signature", Physiological Measurement, vol. 35, No. 9, Aug. 27, 2014, pp. 1913-1926, doi: 10.1088/0967-3334/35/9/1913.

De Haan et al., "Robust pulse-rate from chrominance-based rPPG", IEEE Transactions on Biomedical Engineering, vol. 60, No. 10, Oct. 2013, pp. 2878-2886, doi: 10.1109/TBME.2013.2266196.

Dietrich et al., "BICOS—An Algorithm for Fast Real-Time Correspondence Search for Statistical Pattern Projection-Based Active Stereo Sensors", Applied Sciences, vol. 9, No. 3330, Aug. 14, 2019, 18 pgs., doi: 10.3390/app9163330.

Dosovitskiy et al., "An Image is Worth 16×16 Words: Transformers for Image Recognition at Scale", arXiv2010.11929 [cs.CV], Jun. 3, 2021, 22 pgs.

Droitcour et al., "Range Correlation and I / Q Performance Benefits in Single-Chip Silicon Doppler Radars for Noncontact Cardiopulmonary Monitoring", IEEE Transactions on Microwave Theory and Techniques, vol. 52, No. 3, Mar. 2004, pp. 838-848, doi: 10.1109/TMTT.2004.823552.

Drugman et al., "Audio and Contact Microphones for Cough Detection", arXiv:2005.05313 [eess.AS], May 10, 2020, 4 pgs.

Estepp et al., "Recovering Pulse Rate During Motion Artifact with a Multi-Imager Array for Non-Contact Imaging Photoplethysmography", IEEE International Conference on Systems, Man, and Cybernetics, 2014, pp. 1462-1469, doi: 10.1109/SMC.2014.6974121.

Fang et al., "Wide Field-of-View Locating and Multimodal Vital Sign Monitoring Based on X-Band CMOS-Integrated Phased-Array Radar Sensor", IEEE Transactions on Microwave Theory and Techniques, vol. 68, No. 9, Sep. 2020, pp. 4054-4065, doi: 10.1109/TMTT.2020.2989284.

Feng et al., "Learning an Animatable Detailed 3D Face Model from In-The-Wild Images", Association for Computing Machinery Transactions on Graphics, vol. 40, No. 4, 2021, pp. 1-13, doi: 10.1145/3450626.3459936.

Fitzpatrick, "The Validity and Practicality of Sun-Reactive Skin Types I Through VI", Archives of Dermatology, vol. 124, No. 6, 1988, pp. 869-871, doi: 10.1001/archderm.124.6.869.

Flotho et al., "Multimodal data acquisition at SARS-CoV-2 drive through screening centers: Setup description and experiences in Saarland, Germany", Journal of Biophotonics, vol. 14, No. 8, e202000512, 2021, epub Jun. 8, 2021, 7 pgs., doi: 10.1002/jbio.202000512.

Frerichs et al., "Multimodal remote chest monitoring system with wearable sensors: a validation study in healthy subjects", Physiological Measurement, vol. 41, No. 1, 015006, Feb. 5, 2020, 13 pgs., doi: 10.1088/1361-6579/ab668f.

Garbey et al., "Contact-free measurement of Cardia pulse based on the analysis of thermal imagery", IEEE Transactions on Biomedical Engineering, vol. 54, No. 8, Jul. 16, 2007, pp. 1418-1426, doi: 10.1109/TBME.2007.891930.

Garbey et al., "Estimation of Blood Flow Speed and Vessel Location from Thermal Video", Proceedings of the 2004 IEEE Computer Society Conference on Computer Vision and Pattern Recognition (CVPR'04), Jun. 27-Jul. 2, 2004, vol. 1, 8 pgs., doi: 10.1109/CVPR.2004.1315054.

Garcia-Ceja et al., "Mental health monitoring with multimodal sensing and machine learning: A survey", Pervasive and Mobile Computing, vol. 51, Dec. 2018, pp. 1-26, doi: 10.1016/j.pmcj.2018.09.003.

Haan et al., "Robust Pulse Rate From Chrominance-Based rPPG", IEEE Transactions on Biomedical Engineering, vol. 60, No. 10, 2013, pp. 2878-2886, doi: 10.1109/TBME.2013.2266196.

He et al., "Deep Residual Learning for Image Recognition", Proceedings of the IEEE/CVF Conference on Computer Vision and Pattern Recognition (CVPR), arXiv:1512.03385v1 [cs.CV], published online Dec. 10, 2015, pp. 1-12.

He et al., "IR night vision video-based estimation of heart and respiration rates", IEEE Sensors Applications Symposium (SAS), Mar. 13-15, 2017, 5 pgs., doi: 10.1109/SAS.2017.7894087.

Heist et al., "GOBO projection for 3D measurements at highest frame rates: a performance analysis", Light: Science & Applications, vol. 7, No. 71, Oct. 3, 2018, 13 pgs., doi: 10.1038/s41377-018-0072-3.

Heist et al., "High-speed three-dimensional shape measurement using GOBO projection", Optics and Lasers in Engineering, vol. 87, Dec. 2016, pp. 90-96, doi: 10.1016/j.optlaseng.2016.02.017.

Heist et al., "Theoretical considerations on aperiodic sinusoidal fringes in comparison to phase-shifted sinusoidal fringes for high-speed three-dimensional Shape measurement", Applied Optics, vol. 54, No. 35, Dec. 1, 2015, pp. 10541-10551, doi: 10.1364/AO.54.010541.

Higenbottam et al., "Glottis Narrowing in Lung Disease", American Review of Respiratory Disease, vol. 125, No. 6, Jun. 1982, pp. 746-750 doi: 10.1164/arrd.1982.125.6.746.

Huang et al., "An Investigation of Annotation Delay Compensation and Output-Associative Fusion for Multimodal Continuous Emotion Prediction", AVEC '15: Proceedings of the 5th International Workshop on Audio/Visual Emotion Challenge, Oct. 26, 2015, pp. 41-48, doi: 10.1145/2808196.2811640.

ICNIRP, "Guidelines on limits of exposure to broad-band incoherent optical radiation (0.38 to 3 microM)", Health Physics, vol. 73, No. 3, Sep. 1997, pp. 539-554.

Igarashi et al., "The Appearance of Human Skin: A Survey", Foundations and Trends® in Computer Graphics and Vision, vol. 3, No. 1, 2007, 95 pgs., doi: 10.1561/0600000013.

Imran et al., "AI4COVID-19: AI enabled preliminary diagnosis for COVID-19 from cough samples via an app", Informatics in Medicine Unlocked, vol. 20, No. 100378, 2020, published online Jun. 26, 2020, 13 pgs., doi: 10.1016/j.imu.2020.100378.

(56) References Cited

OTHER PUBLICATIONS

Islam et al., "Data-Driven Compression and Efficient Learning of the Choquet Integral", IEEE Transactions on Fuzzy Systems, vol. 25, No. 4, Sep. 2017, pp. 1908-1922, doi: 10.1109/TFuzz.2017.2755002.

Jiang et al., "Detection of Respiratory Infections Using RGB-Infrared Sensors on Portable Device", IEEE Sensors Journal, vol. 20, No. 22, Nov. 15, 2020, first published Jun. 24, 2020, pp. 13674-13681, doi: 10.1109/JSEN.2020.3004568.

Jicha et al., "Screen and Intervene: The Importance of Early Detection and Treatment of Alzheimer's Disease", The Medical Roundtable General Medicine Edition, vol. 1, No. 1, Apr. 12, 2012, pp. 51-58.

Johansen et al., "Multimodal heartbeat rate estimation from the fusion of facial RGB and thermal videos", 11th International Conference on Machine Vision, Mar. 2019, vol. 11041 of Society of Photo-Optical Instrumentation Engineers (SPIE) Conference Series, 8 pgs., 110410R, doi: 10.1117/12.2523385.

Kachele et al., "Fusion of audio-visual features using hierarchical classifier systems for the recognition of affective states and the state of depression", Proceedings of the International Conference on Pattern Recognition Applications and Methods (ICPRAM), SciTePress, 2014, pp. 671-678, doi: 10.5220/0004828606710678.

Kalman, "A New Approach to Linear Filtering and Prediction Problems", Transactions of the ASME—Journal of Basic Engineering, vol. 82, (Series D), 1960, pp. 35-45.

Kessler et al., "Multimodal fusion including camera photoplethysmography for pain recognition", International Conference on Companion Technology (ICCT), 2017, pp. 1-4, doi: 10.1109/companion.2017.8287083.

Khanam et al., "Non-Contact Automatic Vital Signs Monitoring of Infants in a Neonatal Intensive Care Unit Based on Neural Networks", Journal of Imaging, vol. 7, No. 8, Article 122, 2021, 19 pgs., doi: 10.3390/jimaging7080122.

Kim et al., "Deep Learning for Robust Feature Generation in Audiovisual Emotion Recognition", International Conference on Acoustics, Speech and Signal Processing (ICASSP-88), 1988, Oct. 2013, pp. 3687-3691, doi: 10.1109/ICASSP.2013.6638346.

Krizhevsky et al., "ImageNet Classification with Deep Convolutional Neural Networks", Communications of the ACM, vol. 60, No. 6, Jun. 2017, pp. 84-90, doi: 10.1145/3065386.

Kumar et al., "DistancePPG: Robust non-contact vital signs monitoring using a camera", Biomedical Optics Express, vol. 6, No. 5, May 1, 2015, pp. 1565-1588, first published Apr. 6, 2015, doi: 10.1364/BOE.6.001565.

Laguarta et al., "COVID-19 Artificial Intelligence Diagnosis Using Only Cough Recordings", IEEE Open Journal of Engineering in Medicine and Biology, vol. 1, Sep. 2020, pp. 275-281, doi: 10.1109/OJEMB.2020.3026928.

Lam et al., "Robust Heart Rate Measurement from Video Using Select Random Patches", Conference of International Conference on Computer Vision at Santiago, Chile, Dec. 2015, 9 pgs., doi: 10.1109/ICCV.2015.415.

Lee et al., "Parameter Efficient Multimodal Transformers for Video Representation Learning", arXiv:2012.04124v1 [cs.CV] Dec. 8, 2020, 17 pgs.

Lewandowska et al., "Measuring Pulse Rate with a Webcam—a Non-contact Method for Evaluating Cardiac Activity", Proceedings of the Federated Conference on Computer Science and Information Systems, 2011, pp. 405-410.

Li et al., "Accurate Doppler Radar Noncontact Vital Sign Detection Using the RELAX Algorithm", IEEE Transactions on Instrumentation and Measurement, vol. 59, No. 3, Mar. 2010, pp. 687-695, doi: 10.1109/TIM.2009.2025986.

Li et al., "Learning a model of facial shape and expression from 4D scans", ACM Transactions on Graphics (TOG), vol. 36, No. 6, Article 194, Nov. 2017, pp. 1-17, doi: 10.1145/3130800.3130813.

Li et al., "Model-based Region of Interest Segmentation for Remote Photoplethysmography", 14th International Conference on Computer Vision Theory and Applications, Feb. 2019, Prague, Czech Republic. pp. 383-388, 6 pgs., doi: 10.5220/0007389803830388.

Lin et al., "A Thermal Camera Based Continuous Body Temperature Measurement System", IEEE/CVF International Conference on Computer Vision Workshop (ICCVW), Oct. 2019, 7 pgs., doi: 10.1109/ICCVW.2019.00208.

Liu et al., "3D Mask Face Anti-spoofing with Remote Photoplethysmography" Proceedings of the European Conference on Computer Vision, 2016, pp. 85-100, doi: 10.1007/978-3-319-46478-7_6.

Liu et al., "Motion-Robust Multimodal Heart Rate Estimation Using BCG Fused Remote-PPG With Deep Facial ROI Tracker and Pose Constrained Kalman Filter", IEEE Transactions on Instrumentation and Measurement, vol. 70, Feb. 19, 2021, 15 pgs., doi: 10.1109/TIM.2021.3060572.

Liu et al., "Multi-Task Temporal Shift Attention Networks for On-Device Contactless Vitals Measurement", arXiv:2006.03790v2 [eess.SP], Feb. 28, 2021, 23 pgs.

Lu et al., "Dual-GAN: Joint BVP and Noise Modeling for Remote Physiological Measurement", Proceedings of the IEEE/CVF Conference on Computer Vision and Pattern Recognition, 2021, pp. 12404-12413, doi: 10.1109/CVPR46437.2021.01222.

Lucas et al., "An iterative image registration technique with an application to stereo vision", Proceedings of 7th the International Joint Conference on Artificial Intelligence, 1981, pp. 121-130.

Mao et al., "Neurologic Manifestations of Hospitalized Patients With Coronavirus Disease 2019 in Wuhan, China", Journal of the American Medical Association Neurology, vol. 77, No. 6, Apr. 10, 2020, pp. 683-690, doi: 10.1001/jamaneurol.2020.1127.

Massaroni et al., "Measurement system based on RBG camera signal for contactless breathing pattern and respiratory rate monitoring", IEEE International Symposium on Medical Measurements and Applications (MeMeA), Jun. 11-13, 2018, 6 pgs., doi: 10.1109/MeMeA.2018.8438692.

McDuff et al., "Advancing Non-Contact Vital Sign Measurement using Synthetic Avatars", arXiv:2010.12949v1 [cs.CV], Oct. 24, 2020, pp. 9876-9886.

| Method | F1-2 MAE↓ | F1-2 RMSE↓ | F3-4 MAE↓ | F3-4 RMSE↓ | F5-6 MAE↓ | F5-6 RMSE↓ | Overall MAE↓ | Overall RMSE↓ |
|---|---|---|---|---|---|---|---|---|
| PhysNet [44] w/ Real&Synth | 0.54 | 0.84 | 0.38 | 0.70 | 1.55 | 2.17 | 0.71 | 1.10 |
| PhysNet [44] w/ Real | 0.81 | 1.21 | 0.43 | 0.77 | 2.61 | 3.34 | 1.06 | 1.51 |
| PhysNet [44] w/ Synth | 1.06 | 1.52 | 1.16 | 1.66 | 4.96 | 6.20 | 2.06 | 2.73 |
| PRN [5] w/ Real&Synth | 0.54 | 0.79 | 0.36 | 0.65 | 3.41 | 4.09 | 1.15 | 1.53 |
| PRN [5] w/ Real | 0.65 | 1.02 | 0.40 | 0.71 | 4.35 | 5.26 | 1.43 | 1.90 |
| PRN [5] w/ Synth | 1.47 | 2.00 | 0.63 | 1.07 | 8.89 | 9.88 | 2.97 | 3.47 |
| POS [6] | 3.40 | 4.34 | 3.03 | 3.98 | 8.07 | 10.23 | 4.27 | 5.49 |
| CHROM [8] | 4.00 | 5.11 | 3.99 | 5.25 | 7.45 | 9.74 | 4.70 | 6.22 |
| ICA [36] | 3.75 | 4.73 | 3.26 | 4.19 | 7.51 | 9.34 | 4.35 | 5.50 |

| Method | F1-2 PCC↑ | F1-2 SNR↑ | F3-4 PCC↑ | F3-4 SNR↑ | F5-6 PCC↑ | F5-6 SNR↑ | Overall PCC↑ | Overall SNR↑ |
|---|---|---|---|---|---|---|---|---|
| PhysNet [44] w/ Real&Synth | 0.84 | 14.40 | 0.80 | 17.11 | 0.60 | 9.19 | 0.76 | 14.45 |
| PhysNet [44] w/ Real | 0.81 | 13.13 | 0.77 | 15.83 | 0.59 | 6.54 | 0.74 | 12.84 |
| PhysNet [44] w/ Synth | 0.74 | 7.19 | 0.64 | 6.11 | 0.23 | -3.33 | 0.57 | 4.10 |
| PRN [5] w/ Real&Synth | 0.81 | 12.24 | 0.79 | 14.61 | 0.57 | 4.84 | 0.74 | 11.59 |
| PRN [5] w/ Real | 0.77 | 10.73 | 0.77 | 13.22 | 0.48 | 2.38 | 0.70 | 9.91 |
| PRN [5] w/ Synth | 0.69 | 5.14 | 0.67 | 5.27 | 0.21 | -5.81 | 0.56 | 2.53 |
| POS [6] | 0.50 | -0.30 | 0.42 | -0.09 | 0.27 | -5.38 | 0.41 | -1.34 |
| CHROM [8] | 0.41 | -1.81 | 0.31 | -1.60 | 0.26 | -5.31 | 0.33 | -2.49 |
| ICA [36] | 0.45 | -0.60 | 0.38 | -0.19 | 0.27 | -5.24 | 0.37 | -1.44 |

Table 2. Heart rate estimation results on our real dataset UCLA-rPPG show that both PhysNet and PRN trained with real and synthetic datasets performs consistently better than the models trained with only real data. The improved performance shows the benefit of the synthetic video dataset we generate.

FIG. 4

SYNTHETIC GENERATION OF FACE VIDEOS WITH PLETHYSMOGRAPH PHYSIOLOGY

CROSS-REFERENCE TO RELATED APPLICATIONS

The current application is a U.S. National Stage of PCT Patent Application No. PCT/US2023/065448, entitled "Synthetic Generation of Face Videos with Plethysmograph Physiology" filed Apr. 6, 2023, which claims priority to U.S. Provisional Patent Application No. 63/362,637, entitled "Synthetic Generation of Face Videos with Plethysmograph Physiology" filed Apr. 7, 2022, the disclosure of which is incorporated by reference herein in its entirety.

FIELD OF THE INVENTION

The present invention generally relates to synthetic generation of face videos with plethysmography physiology.

BACKGROUND

Accelerated by telemedicine, advances in Remote Photoplethysmography (rPPG) are beginning to offer a viable path toward non-contact physiological measurement. Unfortunately, the datasets for rPPG are limited as they require videos of the human face paired with ground-truth, synchronized heart rate data from a medical-grade health monitor.

SUMMARY OF THE INVENTION

Systems and methods of synthetic generation of face videos with plethysmography physiology in accordance with embodiments of the invention are described. An embodiment includes a method of synthetic generation of face videos, including: receiving an input image; encoding the input image into a UV albedo map, a 3D mesh, an illumination model $L_{SH}$, and a camera model c; decomposing the UV albedo map into a UV physiological map; varying the UV physiological map according to a target Remote Photoplethysmography (rPPG) signal; generating a plurality of modified PPG UV maps; combining at least one modified PPG UV map with the illumination model $L_{SH}$, camera model c to render final frames with randomized motion; and generating a synthetic rPPG video using the final frames with randomized motion.

In a further embodiment, the at least one modified PPG UV map includes a target pulse signal variation.

In a further embodiment, the camera model c is learned to map a mesh M to image space.

In a further embodiment, the method further includes generating rPPG videos with different attributes including poses, skin tones, and lighting conditions.

In a further embodiment, the UV physiological map is a UV blood map, where the method further comprises first obtaining a spatial concentration of blood $f_{blood}$ of the UV albedo map and then temporally modulate the UV blood map in a way that is consistent with rPPG signals.

In a further embodiment, the method further includes obtaining biophysical parameters directly from the UV albedo map to model underlying blood volume changes.

In a further embodiment, the method further includes training an rPPG network using the generated rPPG videos.

One embodiment includes a system for generating synthetic Remote Photoplethysmography (rPPG) videos, including: at least one processor; and memory coupled to the at least one processor and having programming that causes the processor to execute instructions comprising: receive an input image; encode the input image into a UV albedo map, a 3D mesh, an illumination model $L_{SH}$, and a camera model c; decompose the UV albedo map into a UV physiological map; vary the UV physiological map according to a target Remote Photoplethysmography (rPPG) signal; generate a plurality of modified PPG UV maps; combine at least one modified PPG UV map with the illumination model $L_{SH}$, camera model c to render final frames with randomized motion; and generate synthetic rPPG videos using the final frames with randomized motion.

BRIEF DESCRIPTION OF THE DRAWINGS

FIG. 4 illustrates a table with heart rate estimation results on a real dataset in accordance with an embodiment of the invention.

DETAILED DESCRIPTION OF THE DRAWINGS

Figure 1:
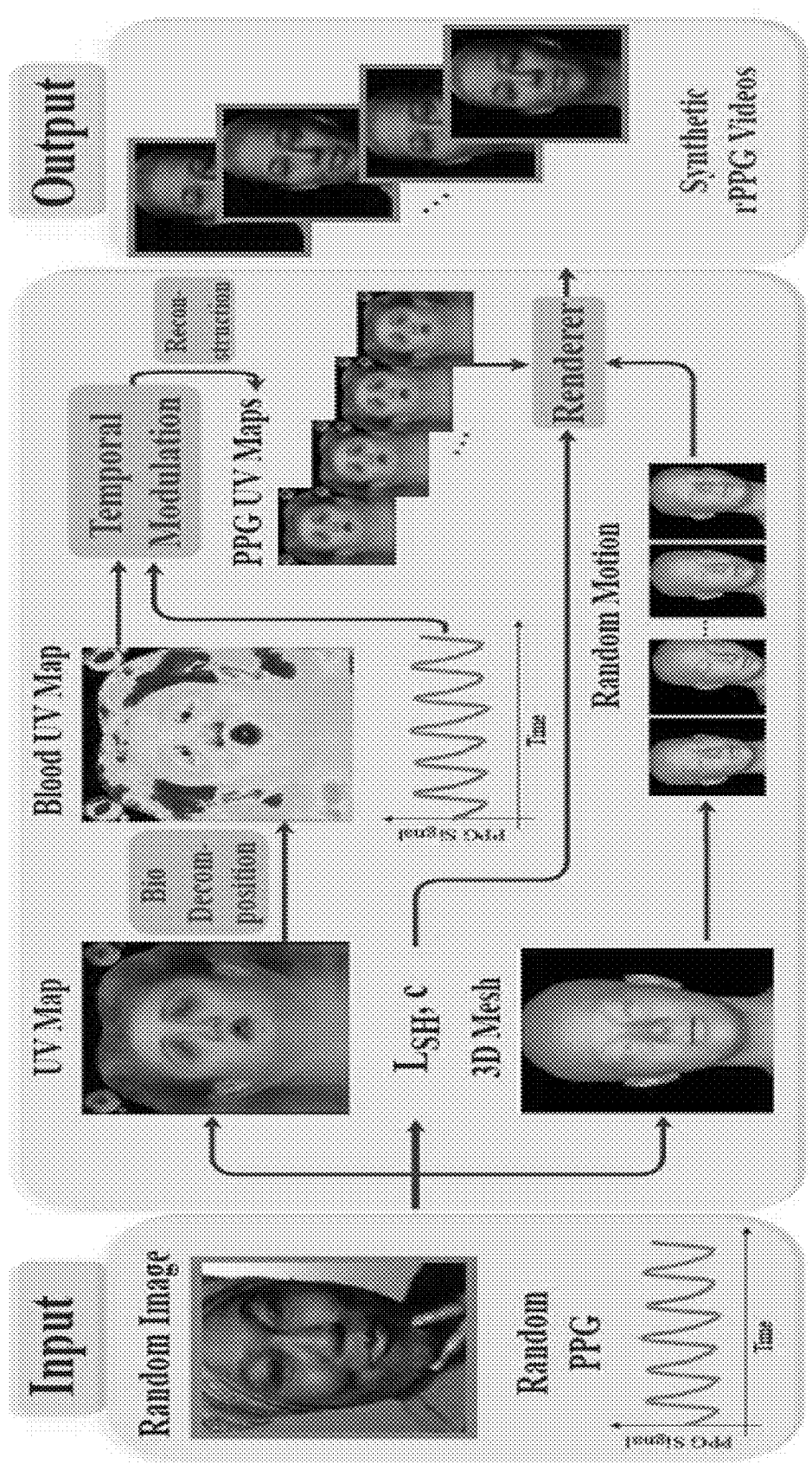
FIG. 1 illustrates a system architecture pipeline of a cross-modal synthetic generation model that can generate rPPG face videos given any face image and target rPPG signal as input in accordance with an embodiment of the invention.

Systems and methods in accordance with various embodiments of the invention provide for scalable biophysics-based learning models that can render realistic remote Photoplethysmography (rPPG) videos with high fidelity to underlying Blood Volume Pulse (BVP). In many embodiments, the synthetically generated videos can be directly utilized to improve the performance of deep rPPG methods. In many embodiments of the system, a rendering model can be deployed to generate data for underrepresented groups, which can provide an effective method to further mitigate demographic bias in rPPG frameworks. Moreover, to facilitate the rPPG advancement, systems in accordance with many embodiments can use real rPPG datasets that includes diverse skin tones. The dataset can be used to benchmark performance across different demographic groups in this area.

Systems in accordance with many embodiments are capable of generating physio-realistic synthetic rPPG video sequences given a reference image and a target rPPG signal as input. The generated videos can be of high fidelity to underlying BVP variations as specified by the input rPPG waveform. Systems in accordance with many embodiments can generate and use a biophysically interpretable manipulation of a UV albedo map obtained from 3D Morphable Face Model (3DMM) and can enable rendering rPPG videos with large variations of various attributes such as facial appearance and expression, head motions and environmental lighting, among others.

Systems in accordance with many embodiments can include receiving an input image, encoding the input image into a UV albedo map, a 3D mesh, an illumination model $L_{SH}$, and a camera model c, decomposing the UV albedo map into a UV physiological map such as a UV blood map among others, varying the UV blood map according to a target Remote Photoplethysmography (rPPG) signal, generating several modified PPG UV maps, combining at least one modified PPG UV map with the illumination model $L_{SH}$, camera model c to render final frames with randomized motion.

In many embodiments, a system can use a large collection of in-the-wild images and PPG recordings, allowing an easy and scalable mechanism to ensure a balanced presence of demographics in generated videos. Systems in accordance with many embodiments, in terms of computational complexity, can achieve up to 1000 times faster than currently available systems.

As noted, accelerated by telemedicine, advances in Remote Photoplethysmography (rPPG) are beginning to offer a viable path toward non-contact physiological measurement. Unfortunately, the datasets for rPPG are limited as they can require videos of the human face paired with ground-truth, synchronized heart rate data from a medical-grade health monitor. Also troubling is that the datasets are not inclusive of diverse populations, e.g., current real rPPG facial video datasets are imbalanced in terms of races or skin tones, leading to accuracy disparities on different demographic groups. Accordingly, systems in accordance with many embodiments provide a scalable biophysical learning based processes to generate physio-realistic synthetic rPPG videos given a reference image and target rPPG signal. Systems in accordance with many embodiments show further improvements in physiological measurement and reduce bias among different groups. Many embodiments of the systems can collect a large rPPG dataset of its kind with a diverse presence of subject skin tones, and this can serve as a benchmark dataset for different skin tones in this area and ensure that advances of the technique can benefit all people for healthcare equity.

Photoplethysmography (PPG) is an optical technique that measures vital signs such as Blood Volume Pulse (BVP) by detecting the light reflected or transmitted through the skin. Remote Photoplethysmography (rPPG) based on camera videos can have several advantages over the conventional PPG methods. It is non-contact thus allowing for a wide range of applications in e.g. neonatal monitoring. It causes no skin irritation and prevents the risk of developing into infection for those whose skins are fragile and sensitive to the adhesive sensing electrodes. As cameras are ubiquitous in electronic device nowadays (such as smartphones, laptops), rPPG can be applied for telemedicine with patients at home and no equipment set-up is needed. Camera-based rPPG techniques have also been used in other applications such as driver monitoring and face anti-spoofing.

Traditional rPPG methods either use Blind Source Separation (BSS) or models based on skin reflectance to separate out the pulse signal from the color changes on the face. These methods usually require pre-processing such as face tracking, registration and skin segmentation. More recently, deep learning and convolutional neural networks (CNN) have been more popular due to its expressiveness and flexibility. CNNs learn the mapping between the pulse signal and the color variations with end-to-end supervised training on the labeled dataset, thus achieving state-of-the-art performance on the vital sign detection. However, the performance of data-driven rPPG networks can hinge on the quality of the dataset.

There are some efforts on collecting a large rPPG dataset for better physiological measurement. Nonetheless, there exists several practical constraints towards collecting real patient data for medical purposes. These include: (1) demographic biases (such as race biases) in society that translate to data. A diverse rPPG dataset may not be accessible for some countries/regions due to geographical distribution of skin colors as reflected in their skin tone world map for indigenous people. (2) necessity of intrusive/semi-intrusive traditional methods for collection of data, (3) patient privacy concerns, and (4) requirement of medical-grade sensors to generate the data. Hence, there is a pressing need for the concept of 'digital patients': physiologically accurate graphical renders that may assist development of algorithms and techniques for improvement of diagnostics and healthcare. Accordingly, systems in accordance with many embodiments provide a neural rendering instantiation in the rPPG field.

Figure 2:
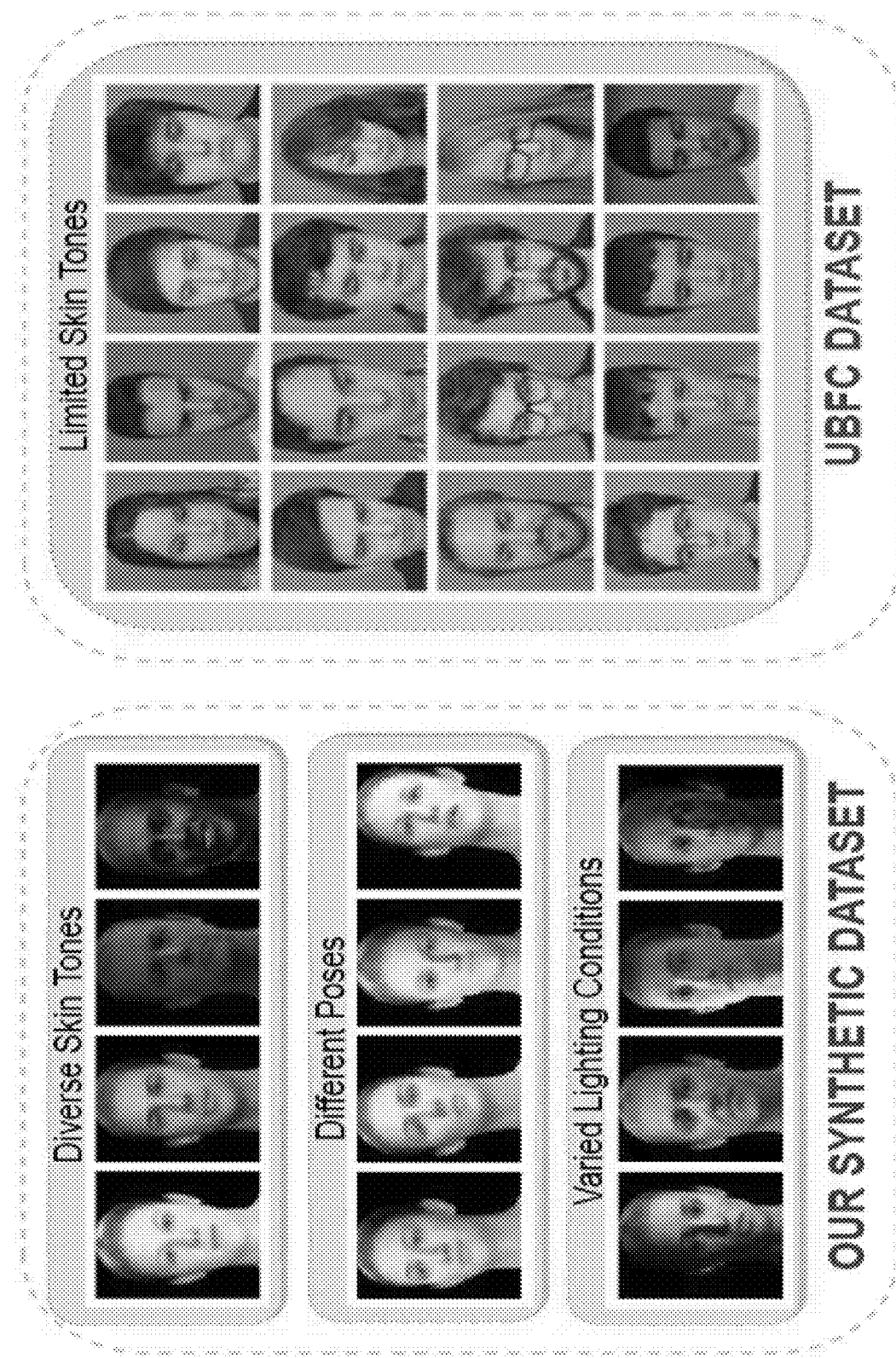
FIG. 2 illustrates a scalable system that can generate synthetic rPPG videos with diverse attributes including poses, skin tones and lighting conditions in accordance with an embodiment of the invention.

For decades, computer graphics has been a driving force for the visuals seen in movies and games. Systems in accordance with many embodiments can harness computer graphics techniques to create not just photorealistic humans, but physio-realistic humans. Many embodiments combine modalities of image and waveform to learn to generate a realistic video that can reflect underlying BVP variations as specified by the input waveform. Systems in accordance with several embodiments achieve this by an interpretable manipulation of UV albedo map obtained from the 3D Morphable Face Model (3DMM). Systems in accordance with many embodiments can provide a model that can generate rPPG videos with large variation of various attributes such as facial appearance and expression, head motions and environmental lighting, among others. FIG. 2 illustrates a scalable system that can generate synthetic rPPG videos with diverse attributes such as poses, ski tones and lighting conditions in accordance with an embodiment of the invention.

Systems in accordance with many embodiments provide a scalable physics-based learning model that can render realistic rPPG videos with high fidelity with respect to underlying blood volume variations. The synthetically generated videos can be directly utilized to improve the performance of the state-of-the-art deep rPPG methods. Notably, the corresponding rendering model can also be deployed to generate data for underrepresented groups, which provides an effective method to further mitigate the demographic bias in rPPG frameworks.

To facilitate the rPPG research, systems in accordance with many embodiments can use a real rPPG dataset that includes diverse skin tones. The dataset can be used to benchmark performance across different demographic groups in this area.

Pipeline Cross-Modal Synthetic Generation Model Pipeline

Systems in accordance with many embodiments, an input image can be encoded into UV albedo map, 3D mesh, illumination model $L_{SH}$ and camera model c. The UV albedo map can be decomposed into blood map, and the system can vary the UV blood map according to the target rPPG signal and generate the modified PPG UV maps. The modified PPG UV map that includes the target pulse signal variation can be combined with $L_{SH}$, c to render the final frames with randomized motion.

rPPG Methods:

rPPG techniques can aim to recover the blood volume change in the skin that is synchronous with the heart rate from the subtle color variations captured by a camera. Signal decomposition methods can include that utilizes Principal Component Analysis (PCA) on the raw traces and chooses the decomposed signal with the largest variance as the pulse signals and Independent Component Analysis (ICA) that demixes the raw signals and determines the separated signals with largest periodicity as the pulse. PCA and ICA can be purely statistical approaches that do not use any prior information unique to rPPG problems. A chrominance-based method (CHROM) can be used to extract the blood volume pulse by assuming a standardized skin-color to white-balance the image and then linearly combine the chrominance signals. Plane Orthogonal to Skin-tone (POS) projects the temporally normalized raw traces onto a plane that is orthogonal to the light intensity change, thus canceling out the effect of that. CNNs have achieved state-of-the-art results on vital sign detection due to their flexibility. The representation for rPPG estimation can be efficiently learned in an end-to-end manner with the annotated datasets instead of handcrafted features for traditional methods. Many embodiments of the system can use two representative work, PhysNet and PRN, to demonstrate the performance of the rPPG models on both real and synthetic datasets.

Real rPPG Datasets:

There have been efforts on collecting real datasets for more accurate physiological sensing. However, these datasets are usually very limited in the number of subject participants and also biased towards certain demographic group. Some work includes subject with darker skin types, but the number is still very limited. Making machine learning methods equitable is of increasing interest in medical domain. There is a lack of a benchmark dataset to measure the performance of various rPPG methods on diverse skin tones, especially dark skin tones in rPPG area. Some prior techniques proposed a dataset that only contains dark skin tones. However, the actual videos are not shared but the color space values of skin region of interest. The current best-performing deep learning algorithms require sizeable input data. The rPPG model trained on such a biased dataset may easily disadvantage certain underrepresented groups in the dataset. The lack of such a benchmark dataset to systematically and rigorously evaluate various methods on diverse skin tones makes it hard to ensure that the rPPG methods deployed into the society would not cause biases against certain groups that are underrepresented. Many embodiments can include a real dataset that represents a first step towards filling this gap.

Synthetic Generation of rPPG Videos:

The real rPPG dataset construction is a laborious process and generally takes a large amount of time for collection and administrative work for Institutional Review Board (IRB) approval. Therefore, it is beneficial to have a scalable method that can generate large-scale synthetic rPPG datasets for data augmentation. Accordingly, systems in accordance with many embodiments provide for synthetic generation processes that can generate diverse appearance with any in-the-wild image and target rPPG signal as input and the generation can be a forward pass of a neural network.

Systems in accordance with many embodiments provide a scalable model and processes that can generate synthetic datasets with a given reference image and target rPPG signal. The generated videos can be used to train the state-of-the-art rPPG networks.

Synthesizing Biorealistic Face Videos

In many embodiments, a 3DMM model can be used to obtain the facial albedo maps and then obtain facial blood maps from the extracted albedo by analyzing light transport in the skin. Further details about how to generate synthetic facial videos with the decomposed blood maps and the source of the input facial images and PPG waveforms are described herein. FIG. 1 illustrates a synthetic generation pipeline in accordance with an embodiment of the invention.

Non-Linear 3DMM

To generate faces with different poses, illuminations and desirable rPPG signal variations, many embodiments of the system can infer the 3D shape and albedo parameters of the face. In many embodiments, a system can use DECA to predict subject-specific albedo, shape, pose, and lighting parameters from an image. A system may use a statistical 3D head model FLAME to output a mesh M with a number of vertices (e.g., n=5023 vertices). A camera model c can be learned to map the mesh M to image space. Since there may be no appearance model in FLAME, the linear albedo subspace of Basel Face Model (BFM) can be used and the UV layout of BFM can be converted to be compatible with FLAME. Systems in accordance with many embodiments can output a UV albedo map A with a learnable coefficient α. By expressing illumination model as the Spherical Harmonics (SH), the shaded face image can be represented as the following equation:

$$B(\alpha, l, N_{uv})_{i,j} = A(\alpha)_{i,j} \odot \sum_{k=1}^{9} l_k H_k(N_{i,j}), \quad (1)$$

where $H_k$ is the SH basis, $l_k$ are the corresponding coefficients and $\odot$ denotes the Hadamard product. $N_{i,j}$ is the normal map expressed in the UV form. The final texture image can be obtained by rendering the image using the mesh M, shaded image B, and the camera model c through a rendering function $\mathcal{R}(\cdot)$:

$$I_r = \mathcal{R}(M, B, c). \quad (2)$$

As rPPG can be essentially the change of blood volume in the face, systems in accordance with many embodiments can first obtain the spatial concentration of blood $f_{blood}$ of the UV albedo A and then temporally modulate the UV blood albedo map in a way that is consistent with the rPPG signals. Described below are how this biophysically interpretable manipulation can be achieved.

Light Transport in the Skin:

In order to obtain blood map $f_{blood}$ on the face, systems in accordance with many embodiments can analyze light transport in the skin to build the connection between face albedo and $f_{blood}$. Following a spectral image formation model, the original UV face albedo $A_c$ with $c \in \{R, G, B\}$ can be reconstructed by integrating the product of the camera spectral sensitivities $S_c$, the spectral reflectance R, and the spectral power distribution of the illuminant E over wavelength λ:

$$A_c = \int_\lambda E(\lambda)R(f_{mel}, f_{blood}, \lambda)S_c(\lambda)d\lambda. \tag{3}$$

An optical skin reflectance model with hemoglobin $f_{blood}$ and melanin map $f_{mel}$ as parameters can be utilized to define the wavelength-dependent skin reflectance $R(f_{mel}, f_{blood}, \lambda)$. Specifically, systems in accordance with many embodiments can apply a two-layer skin model that characterizes the transmission through the epidermis $T_{epidermis}$ and reflection from the dermis $R_{dermis}$:

$$R(f_{mel}, f_{blood}, \lambda) = T_{epidermis}(f_{mel}, \lambda)^2 R_{dermis}(f_{blood}, \lambda). \tag{4}$$

The transmittance in epidermis can be modeled by Lambert-Beer law as light not absorbed by the melanin in this layer is propagated to the dermis:

$$T_{epidermis}(f_{mel}, \lambda) = e^{-\mu_{a.epidermis}(f_{mel},\lambda)}, \tag{5}$$

where $\mu_{a.epidermis}(f_{mel}, \lambda)$ is the absorption coefficient of the epidermis. More specifically, $$\mu_{a.epidermis}(f_{mel}, \lambda) = f_{mel}\mu_{a.mel}(\lambda) + (1 - f_{mel})\mu_{skin\,baseline}(\lambda), \tag{6}$$

where $\mu_{a.mel}$ is the absorption coefficient of melanin and $\mu_{skinbaseline}$ is baseline skin absorption coefficient.

The reflectance in dermis can be modeled using the Kubelka-Munk theory, and the proportion of light remitted from a layer is given by:

$$R_{dermis}(f_{blood}, \lambda) = \frac{(1-\beta^2)(e^{Kd_{pd}} - e^{-Kd_{pd}})}{(1+\beta^2)e^{Kd_{pd}} - (1-\beta)^2 e^{-Kd_{pd}}}, \tag{7}$$

where $d_{pd}$ is the thickness of the dermis, and K and β are related to the absorption of the medium contained within the dermis (e.g. blood). For simplicity of notation, the dependence of K and β on $f_{blood}$ and λ can be dropped in Equation (7).

Biophysical Decomposition and Variation of UV Albedo Map:

With the light transport theory of the skin, systems in accordance with many embodiments can apply a physics-based learning framework (e.g., BioFaceNet) to obtain $f_{blood}$ from albedo A. The wavelengths can be discretized into a number of parts and spacing (e.g., 33 parts from 400 nm to 720 nm with 10 nm equal spacing). Many embodiments of the system can use an autoencoder architecture and use a fully-convolutional network as encoder to predict the hemoglobin and melanin maps and fully-connected networks to encode the parameters for lighting E and camera spectral sensitivities $S_c$. The model-based decoder is then to reconstruct the albedo with all the learned parameters according to Equation (3).

Systems in accordance with many embodiments can obtain biophysical parameters directly from the UV albedo maps instead of the facial images. This arrangement may allow to model the underlying blood volume changes more precisely regardless of the environmental illumination variations. Systems in accordance with many embodiments, a model can be trained to minimize the following loss function:

$$\mathcal{L} = w_1 \mathcal{L}_{appearance} + w_2 \mathcal{L}_{CameraPrior}, \tag{8}$$

where the appearance loss $\mathcal{L}_{appearance}$ is the L2 distance between the reconstructed UV map $A_{linRecon}$ and the original one in the linear RGB space $A_{linRGB}$. Many embodiments can convert A to linear space by inverting the Gamma transformation with γ=2.2. To make the problem more constrained, many embodiments introduce the additional camera prior loss: $\mathcal{L}_{CameraPrior}=\|b\|_2^2$, where b is the prior for the camera spectral sensitivities. $w_1$ and $w_2$ are the weights for the reconstructed loss and camera prior loss, respectively.

To reflect the change of the target rPPG signal on the face, many embodiments temporally vary the UV blood map $f_{blood}$ linearly with the target rPPG signal in the test phase. Given the blood map of a reference UV map (e.g. the UV blood map of first frame), many embodiments generate the UV blood map of the consequent frames as the multiplication of the UV blood map of the reference frame and a ratio scalar that is calculated as the ratio of $p_t$ (rPPG signal at time t) and $p_{ref}$ (rPPG signal at the reference time). Then the modified UV blood map of each frame that contains the desired rPPG signal can be reconstructed using the BioFaceNet decoder to get UV map. The final image can be rendered using the UV map combined with illumination and camera model according to Equation (2).

For the purpose of simulating real-world scenarios where the subject might move in the collection process, many embodiments can randomize the poses in the generation of the sequence of the frames by adding a small random value to the pose and expression parameter of the previous frame.

Face Image Dataset:

To generate synthetic rPPG videos with diverse face appearances, systems in accordance with many embodiments can use the public in-the-wild face datasets BUPT-Balancedface. It can be categorized according to ethnicity (e.g. Caucasian, Indian, Asian and African). In many embodiments, these images can be used as the reference images for generating the synthetic videos as shown in FIG. 1 in accordance with an embodiment of the invention. Although FIG. 1 illustrates a particular system pipeline of a cross-modal synthetic generation model that generates rPPG videos, any of a variety of system configurations can be utilized as appropriate to the requirements of specific applications in accordance with embodiments of the invention.

Ppg Recordings:

To synthesize videos of a given input PPG signal, systems in accordance with many embodiments may use PPG waveforms recordings from BIDMC PPG and Respiration Dataset. It can include a number of contact PPG recordings of a certain length (e.g., 53 videos of 8 minutes in length) with sampling frequency 125 Hz. Many embodiments sample it correspondingly with the video frame rate (e.g., 30 Hz) and the first sequences of time length L can be used where L is the duration of the generated video.

Many embodiments can use two state-of-the-art deep rPPG networks PhysNet and PRN to benchmark the performance on both real and synthetic datasets. PhysNet and PRN both utilize 3D convolutional neural networks (3D-CNN) architecture to learn spatio-temporal representation of the rPPG videos and predict the rPPG signal in the facial videos.

PRN differs in that it uses residual connection for convolutional layers. They take consecutive frames of length T as the input, and its output is the corresponding BVP value for each input frame. The Negative Pearson loss is used to measure the difference between the ground-truth PPG signal p and the estimated rPPG signal p:

$$L_{ppg}(p, \hat{p}) = 1 - \frac{T\sum_i p_i \hat{p}_i - \sum_i p_i \sum_i \hat{p}_i}{\sqrt{\left(T\sum_i p_i^2 - \left(\sum_i p_i\right)^2\right)\left(T\sum_i \hat{p}_i^2 - \left(\sum_i \hat{p}_i\right)^2\right)}}, \quad (9)$$

where all the summation is over the length of frames T.
Implementations:

For the training of BioFaceNet, systems in accordance with many embodiments can use a number (e.g., 3000) of face albedo images with a number (e.g., 750) images in each race. Many embodiments can use a percentage of the (e.g., 80%) images for training and a percentage (e.g., 20%) for validation. The weight $w_1$ and $w_2$ for the loss can be $1e^{-3}$ and $1e^{-4}$ respectively. The learning rate can be set as $1e^{-4}$ and the number of epochs can be e.g., 200. For the generation of synthetic videos, many embodiments can set the length of generated frames L as e.g., 2100.

The bounding boxes of the videos can be generated using a pretrained Haar cascade face detection model. For each video, one bounding box can be detected and increased a certain percentage (e.g., 60%) in each direction before the frames are cropped. To be consistent with the original papers, each frame can be resized to a number of pixels (e.g., 128×128 pixels) using bilinear interpolation for PhysNet and e.g., 80×80 for PRN. The length of training clips T is e.g., 128 for PhysNet and e.g., 256 for PRN. The Adam optimizer can be used and the learning rate is set as $1e^{-4}$.

Figure 8:
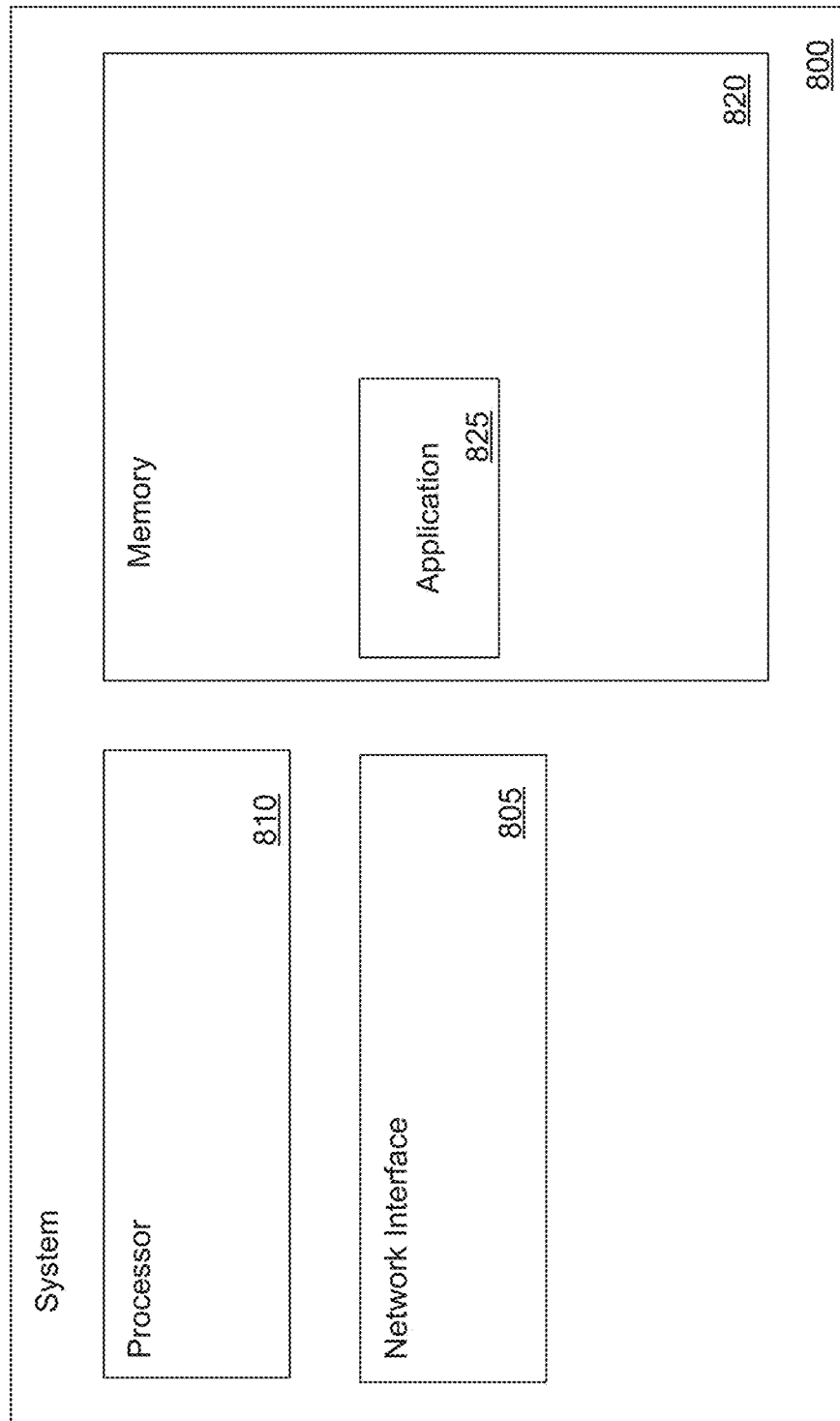
FIG. 8 illustrates a computer system architecture for synthetic generation of rPPG videos in accordance with an embodiment of the invention.

A computer system architecture for synthetic generation of rPPG videos in accordance with many embodiments of the invention is illustrated in FIG. 8. The system 800 system includes a processor 810 that can be configured to execute instructions, a network interface that can communicate with one or more external interfaces, and a memory 820 that can include one or more applications 825. Although FIG. 8 illustrates a particular computer system architecture that can generate synthetic rPPG videos, any of a variety of computer architectures can be utilized as appropriate to the requirements of specific applications in accordance with embodiments of the invention.

Experiments

Described now are datasets used for the experiments and evaluation protocol.
UCLA-rPPG Real Dataset:

In order to benchmark the performance of current rPPG estimation methods, we collect a real dataset of 104 subjects. The setting is faulty for two of them so we dropped their samples. Finally, the dataset consists of 102 subjects of various skin tone, age, gender, ethnicity and race. The Fitzpatrick (FP) skin type scale of the subjects varies from 1-6. For each subject, we record 5 videos of about 1 minute each (1790 frames at 30 fps). After removing erroneous videos we have total 503 videos. All the videos in our dataset are uncompressed and synchronized with the ground truth heart rate.

Figure 3:
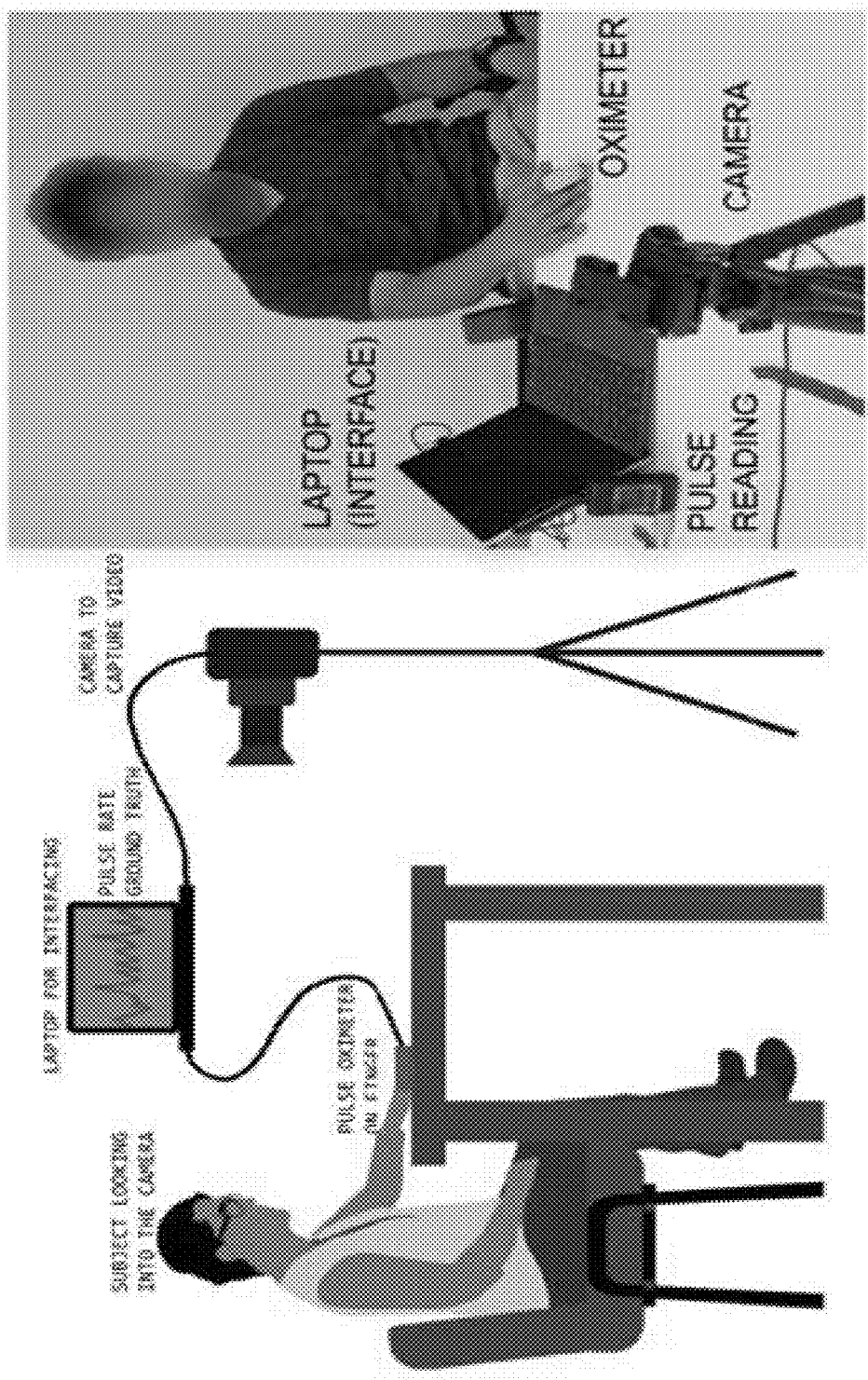
FIG. 3 illustrates an experimental setup of data collection in accordance with an embodiment of the invention.

FIG. 3 illustrates a data collection process of a real dataset UCLA-rPPG in accordance with an embodiment of the invention. The left part of the figure is a cartoon illustration of the data collection process. The right part of the figure is a photo depicting the actual data collection process. The human subjects wear an oximeter on finger and looks into the camera. Both the camera and the oximeter are connected to a laptop to get synchronous data.
UBFC-rPPG:

UBFC-rPPG database contains 42 front facing videos of 42 subjects and corresponding ground truth PPG data recorded from a pulse oximeter. The videos are recorded at 30 frames per second with a resolution of 640×480. Each video is roughly one minute long.
Metrics:

To evaluate how the heart rate estimates compare with gold-standard heart rates obtained from gold-standard pulse waves, we use the following four metrics Mean absolute error (MAE), Root Mean Squared Error (RMSE), Pearson's Correlation Coefficient (PCC) and Signal-to-Noise Ratio (SNR).

For traditional baseline methods POS, CHROM and ICA we compare, we use iPhys toolbox to get the estimated rPPG waveforms. The output rPPG signals are normalized by subtracting the mean and dividing by the standard deviation. We filter all the model outputs using a 6th-order Butterworth filter with cut-off frequencies 0.7 and 2.5 Hz. The filtered signals are divided into 30-second windows with 1-second stride and the above four evaluation metrics are calculated on these windows and averaged.
Performance on UCLA-rPPG For the study of this work, we split the subjects into three skin tone groups based on the Fitzpatrick skin type. They are light skin tones, consisting of skin tones in the FP 1 and 2 scales, medium skin tones, consisting of skin tones in the FP 3 and 4 scales, and dark skin tones, consisting of skin tones in the FP 5 and 6 scales. This aggregation helps compare experimental results on skin tones more objectively. Since our ultimate goal is to improve the performance on our dataset, we first train on all the synthetic data and then finetune on the real data for the models trained with both real and synthetic data. For training and testing deep rPPG networks PhysNet and PRN on real dataset, we randomly split all the subjects into training, validation and test set with 50%, 10% and 40% and all the test results are averaged on three random splits. The validation set is used to select the best epoch for testing the model.

FIG. 4 illustrates (Left Ablation study) a model pretrained with all synthetic dataset outperforms these pretrained on either light or dark skin tones alone; Right: Bias mitigation, the standard deviation of MAE and RMSE of the deep rPPG models trained with real and synthetic dataset are smaller than real data alone and the traditional models.

We report results on the three groups and overall performance using evaluation metrics of MAE, RMSE, PCC and SNR in table: vital. In general, models trained with both real and synthetic data perform consistently better than using real data alone on all the skin tones for all evaluation metrics. PhysNet trained with both real and synthetic data achieved the best overall MAE result 0.71 BPM, with 33% reduction in error compared with PhysNet trained with only real data (1.06 BPM). Notably, the performance improvement is most significant on dark skin stones F5-6 group with 41% and 35% reduction in MAE and RMSE respectively for PhysNet. The same phenomenon is also observed for PRN, where the improvement is most noticeable for darker skin tones. We attribute this to the introduction of synthetic videos generated. The other two metrics PCC and SNR also validate the superiority of the model trained with both real and synthetic datasets. The results for traditional methods POS, CHROM and ICA are far worse than the deep learning methods, as these methods usually takes the average of all the pixels and ignore the inhomogeneous spatial contribution of the pixels to pulsatile signals.

Bias Mitigation:

To evaluate the bias of various rPPG methods on subjects with diverse skin tones, we use the standard deviation of the MAE and RMSE results on three skin tone groups. From the right of fig:bias_plot, we can see the standard deviation of PhysNet with both real and synthetic dataset is the smallest and the MAE disparity among all the three groups are reduced by 45% (from 0.95 BPM to 0.52 BPM) compared with the model trained with only real dataset. Similarly, the standard deviations of both metrics MAE and RMSE for PRN are also reduced for the model trained with both real and synthetic datasets.

Figure 5:
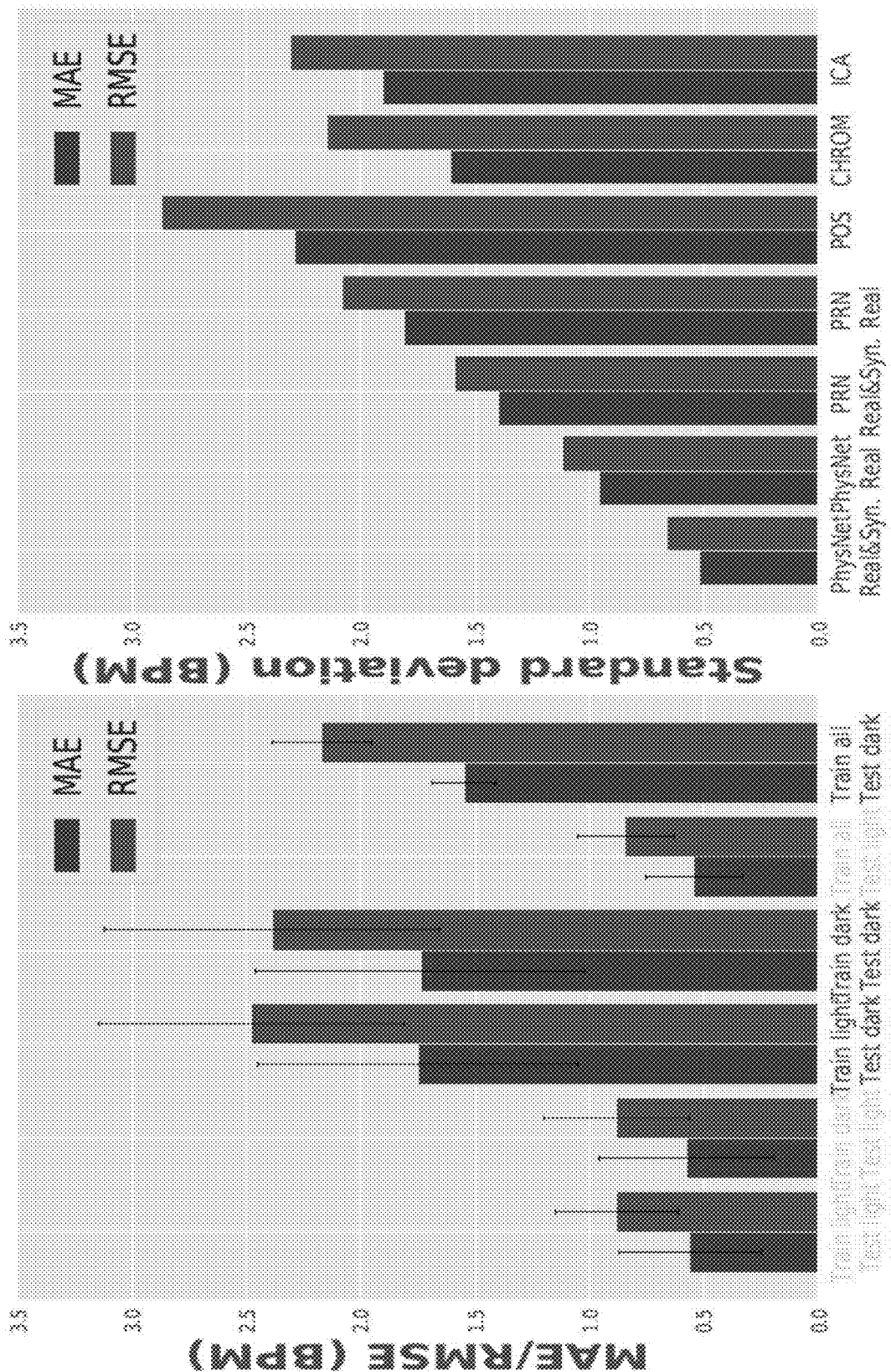
FIG. 5 illustrates, left, ablation study with a model pre-trained with synthetic dataset outperforms model pre-trained on either light or dark skin tones alone, and right, bias mitigation, where the standard deviation of MAE and RMSE of a deep rPPG models trained with real and synthetic dataset are smaller than real data alone and the traditional models in accordance with an embodiment of the invention.
Figure 6:
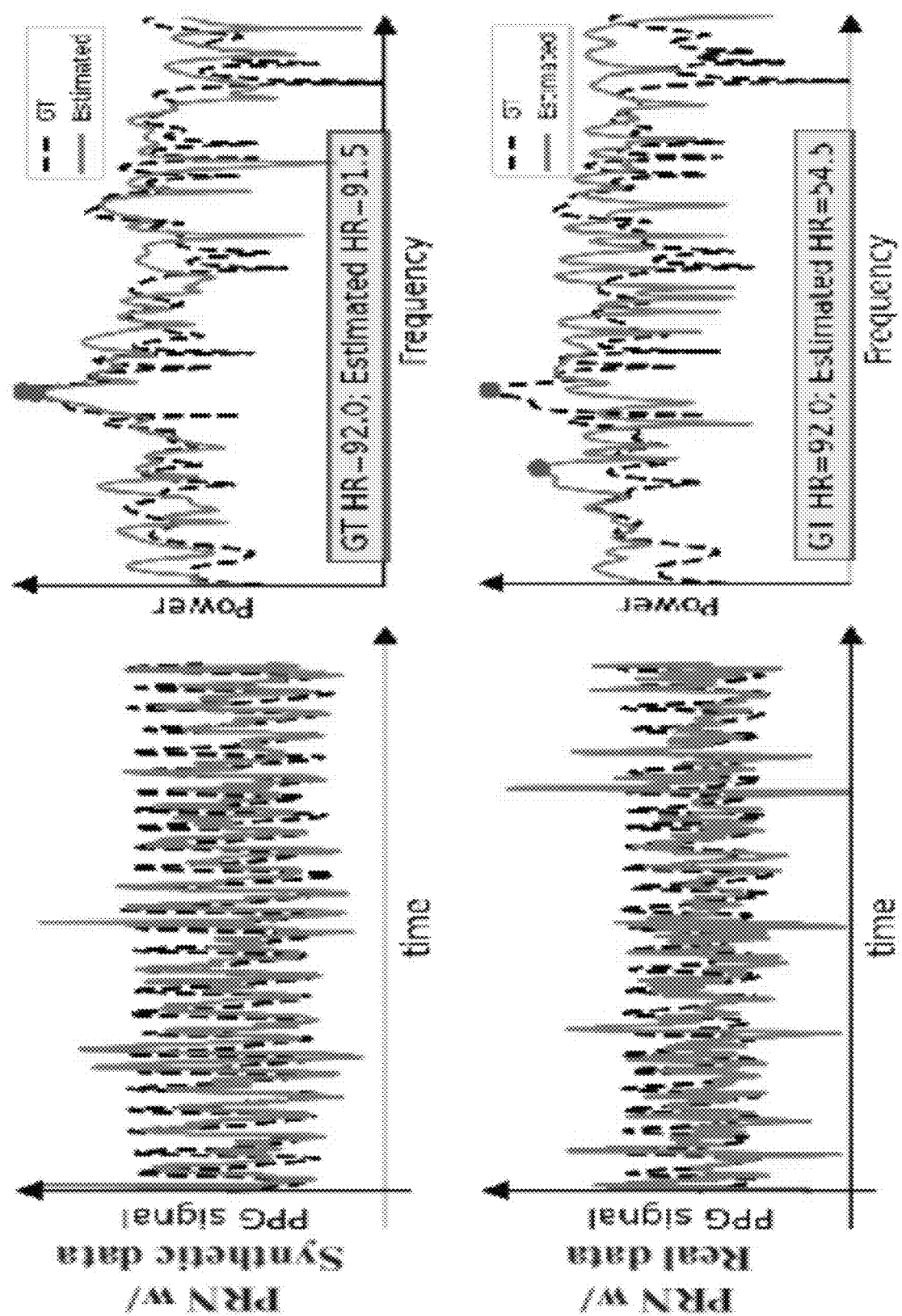
FIG. 6 illustrates an example that shows that PRN trained with synthetic data (above) generalizes better than PRN trained with real data (bottom) on UBFC-rPPG dataset in accordance with an embodiment of the invention.

FIG. 5 illustrates an example shows that PRN trained with synthetic data (above) generalizes better than PRN trained with real data (bottom) on UBFC-rPPG dataset. The waves are more aligned with the ground-truth PPG wave (dashed black line) and the power spectrum plot is also more consistent with the ground-truth for the PRN trained with synthetic data.

Ablation Study:

We first pre-train the PhysNet with either light skin tones (subjects with race Caucasian in the synthetic dataset) or dark skin tones (subjects with race African), then finetune the model on real dataset and test the model on real subjects with either light skin tones or dark skin tones. From the left of FIG. 5, we can see the model with the pre-trained rPPG network on diverse races are consistently better than these on a single race. The improvement is more obvious on dark skin tones test set. This demonstrates the benefits of a diverse synthetic dataset.

Figure 7:
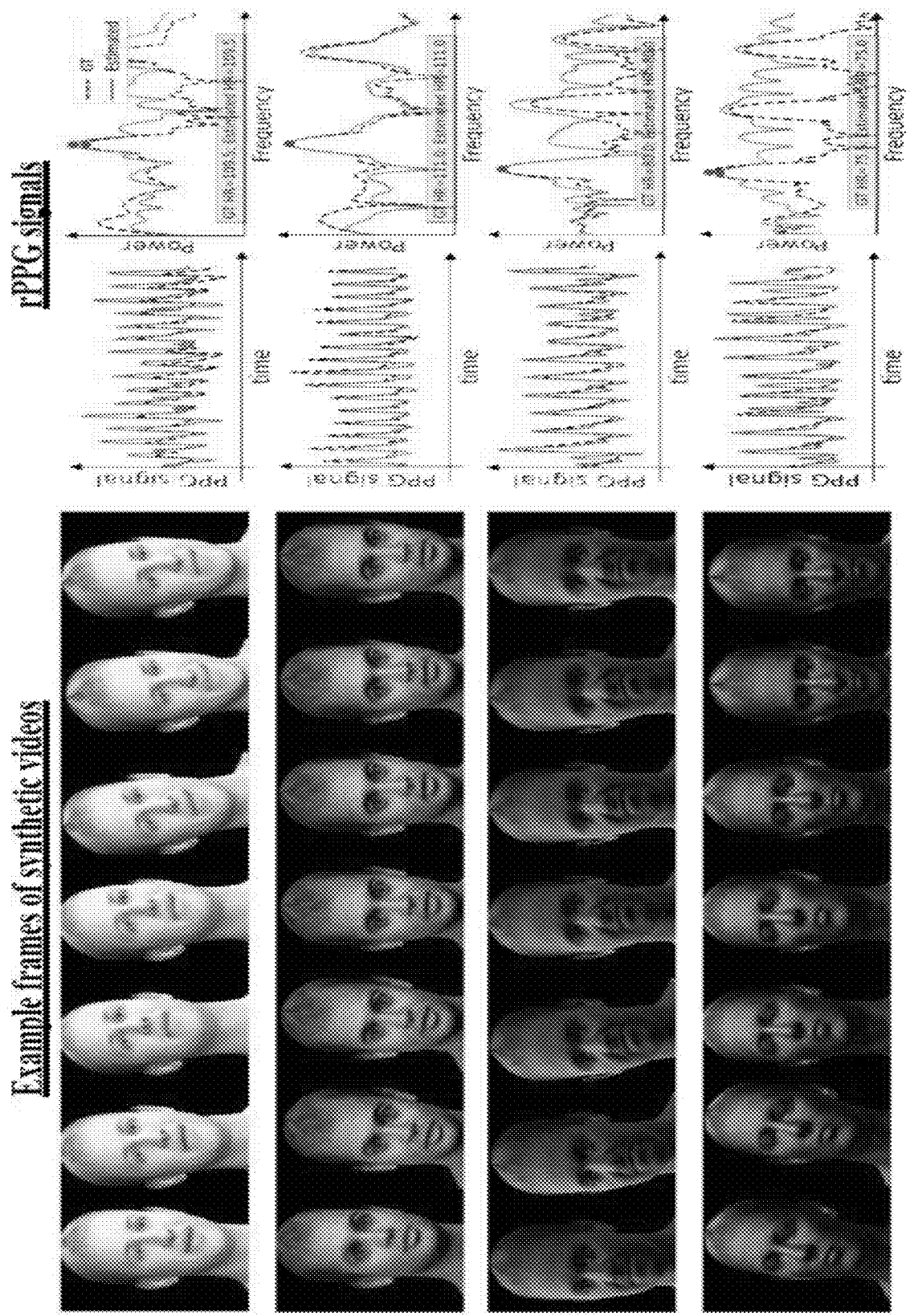
FIG. 7 illustrates example frames of generated synthetic video with incorporated PPG signals into a reference image in accordance with an embodiment of the invention.

FIG. 7 illustrates example frames of generated synthetic videos in accordance with an embodiment of the invention. A framework in accordance with many embodiments has successfully incorporated PPG signals into the reference image. The estimated pulse waves from PRN for generated synthetic videos are highly correlated to the ground-truth waves, and the heart rates are preserved as shown in the power spectrum plot.

Performance on UBFC-rPPG

We use the model with best performance on our real dataset to test them on UBFC-rPPG dataset along with the traditional methods. Since this is a cross-dataset evaluation for the model trained on UCLA-rPPG, we test the deep learning models on all the subjects in UBFC-rPPG. All the results with four evaluation metrics are reported in tab:ubfc. While the synthetic dataset performs worse than the models trained in our real dataset, the performance gain is more obvious in UBFC dataset. The MAE of PhysNet trained on synthetic dataset achieved the lowest MAE and RMSE (0.84 BPM and 1.76 BPM respectively). The explanation for this observation is that when the distribution of the dataset is similar to the distribution of the test data as in the intra-dataset setting in our real dataset, the benefits of synthetic datasets are not straightforward. The models trained on real dataset perform worse on generalizing to another dataset due to different environmental setting such as lighting. We also give a qualitative study in FIG. 7 that shows that the rPPG wave extracted using our synthetic dataset resemble more closely to the ground-truth than that using real dataset. As a result, it gives more accurate heart rate estimation.

Visualization

As shown in FIG. 7 in accordance with an embodiment, a system can successfully produce synthetic avatar videos that reflect the associated underlying blood volume changes. Estimated pulse waves from the synthetic videos are closely aligned with the ground truth. The power spectrum of the PPG waves with a clear peak near the gold-standard HR value also validates the effectiveness of the incorporation of pulsatile signals.

Limitations:

Though our synthetic dataset could be used to achieve state-of-the-art results (on UBFC-rPPG datasets, it alone can generalize even better than the model trained on real dataset) for heart rate estimation, the facial appearance is not photo-realistic, which may still degrade the performance due to sim2real gap. We are not focused on modeling the background in the generated videos in this work. However, it is found in that the background can be utilized for better pulsatile signals extraction. Also we vary the UV blood map linearly according to the target rPPG signals in the synthetic generation method. While this yields reasonable empirical results, we believe biophysical model based manipulation of the UV blood map could further improve the performance of the synthetic generation.

Although specific implementations for synthetic generation of face videos with plethysmography physiology are discussed above with respect to FIG. 1, any of a variety of implementations utilizing the above discussed techniques can be utilized for synthetic generation of face videos with plethysmography physiology in accordance with embodiments of the invention. While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. A method of synthetic generation of face videos, comprising:
   receiving an input image;
   encoding the input image into a UV albedo map, a 3D mesh, an illumination model $L_{SH}$, and a camera model c;
   decomposing the UV albedo map into a UV physiological map;
   varying the UV physiological map according to a target Remote Photoplethysmography (rPPG) signal;
   generating a plurality of modified PPG UV maps;
   combining at least one modified PPG UV map with the illumination model $L_{SH}$, camera model c to render final frames with randomized motion; and
   generating a synthetic rPPG video using the final frames with randomized motion.

2. The method of claim 1, wherein the at least one modified PPG UV map includes a target pulse signal variation.

3. The method of claim 1, wherein the camera model c is learned to map a mesh M to image space.

4. The method of claim 1, further comprising generating rPPG videos with different attributes including poses, skin tones, and lighting conditions.

5. The method of claim 1, wherein the UV physiological map is a UV blood map, where the method further comprises first obtaining a spatial concentration of blood $f_{blood}$ of the UV albedo map and then temporally modulate the UV blood map in a way that is consistent with rPPG signals.

6. The method of claim 1, further comprising obtaining biophysical parameters directly from the UV albedo map to model underlying blood volume changes.

7. The method of claim 1, further comprising training an rPPG network using the generated rPPG videos.

8. A system for generating synthetic Remote Photoplethysmography (rPPG) videos, comprising:
   at least one processor; and
   memory coupled to the at least one processor and having programming that causes the processor to execute instructions comprising:
   receive an input image;
   encode the input image into a UV albedo map, a 3D mesh, an illumination model $L_{SH}$, and a camera model c;
   decompose the UV albedo map into a UV physiological map;
   vary the UV physiological map according to a target Remote Photoplethysmography (rPPG) signal;
   generate a plurality of modified PPG UV maps;
   combine at least one modified PPG UV map with the illumination model $L_{SH}$, camera model c to render final frames with randomized motion; and
   generate synthetic rPPG videos using the final frames with randomized motion.

9. The system of claim 8, wherein the at least one modified PPG UV map includes a target pulse signal variation.

10. The system of claim 8, wherein the camera model c is learned to map a mesh M to image space.

11. The system of claim 8, wherein the processor further executes instructions comprising generating rPPG videos with different attributes including poses, skin tones, and lighting conditions.

12. The system of claim 8, wherein the UV physiological map is a UV blood map, wherein the processor further executes instructions comprising first obtaining a spatial concentration of blood $f_{blood}$ of the UV albedo map and then temporally modulate the UV blood map in a way that is consistent with rPPG signals.

13. The system of claim 8, wherein the processor further executes instructions comprising obtaining biophysical parameters directly from the UV albedo map to model underlying blood volume changes.

14. The system of claim 8, wherein the processor further executes instructions comprising training an rPPG network using the generated rPPG videos.

\* \* \* \* \*